United States Patent
Agarwal et al.

(10) Patent No.: US 11,860,799 B2
(45) Date of Patent: Jan. 2, 2024

(54) MEMORY REQUEST MODULATION

(71) Applicant: Micron Technology, Inc., Boise, ID (US)

(72) Inventors: Nikesh Agarwal, Bangalore (IN); Chandana Manjula Linganna, Bangalore (IN)

(73) Assignee: Micron Technologies, Inc., Boise, ID (US)

( * ) Notice: Subject to any disclaimer, the term of this patent is extended or adjusted under 35 U.S.C. 154(b) by 8 days.

(21) Appl. No.: 17/556,924

(22) Filed: Dec. 20, 2021

(65) Prior Publication Data
US 2023/0195657 A1   Jun. 22, 2023

(51) Int. Cl.
*G06F 13/42* (2006.01)
*G06F 13/16* (2006.01)
*G06F 9/30* (2018.01)

(52) U.S. Cl.
CPC ...... *G06F 13/1621* (2013.01); *G06F 9/30101* (2013.01); *G06F 13/1642* (2013.01); *G06F 13/1668* (2013.01); *G06F 13/4221* (2013.01)

(58) Field of Classification Search
CPC ............ G06F 13/1621; G06F 13/1642; G06F 13/1668; G06F 13/4221; G06F 9/30101
USPC ....................................................... 711/154
See application file for complete search history.

(56) References Cited

U.S. PATENT DOCUMENTS

| | | | |
|---|---|---|---|
| 6,532,501 B1 * | 3/2003 | McCracken | G06F 13/1642 710/39 |
| 7,406,546 B1 * | 7/2008 | Vignon | G06F 13/4282 710/36 |
| 9,426,084 B1 * | 8/2016 | Bare | H04L 47/39 |
| 10,437,758 B1 * | 10/2019 | Mathews | G06F 13/18 |
| 11,055,243 B1 * | 7/2021 | Pan | G06F 13/4031 |
| 11,138,101 B2 * | 10/2021 | Guim Bernat | G06F 12/02 |
| 2005/0220025 A1 * | 10/2005 | Noguchi | H04L 47/34 370/282 |
| 2006/0050639 A1 * | 3/2006 | Stuart | H04L 47/50 370/235 |
| 2011/0075555 A1 * | 3/2011 | Ziegler | H04L 49/555 370/229 |
| 2013/0042032 A1 * | 2/2013 | Mannava | G06F 13/364 710/52 |
| 2014/0244920 A1 * | 8/2014 | Biswas | G06F 13/16 711/146 |

(Continued)

*Primary Examiner* — Christopher B Shin
(74) *Attorney, Agent, or Firm* — Colby Nipper PLLC

(57) ABSTRACT

Described apparatuses and methods enable a receiver of requests, such as a memory device, to modulate the arrival of future requests using a credit-based communication protocol. A transmitter of requests can be authorized to transmit a request responsive to possession of a credit corresponding to the communication request. In these situations, if the transmitter has exhausted a supply of credits, the transmitter waits until a credit is returned before transmitting another request. The receiver of the requests can manage credit returns based on whether a request queue has space to receive another request. Further, the receiver can delay a credit return based on how many requests are pending at the receiver, even if space is available in the request queue. This delay can prevent an oversupply of requests from developing downstream of the request queue. Latency, for instance, can be improved by managing the presence of requests that are downstream.

46 Claims, 9 Drawing Sheets

(56) References Cited

U.S. PATENT DOCUMENTS

| | | | |
|---|---|---|---|
| 2017/0295112 A1* | 10/2017 | Cheng | H04L 49/254 |
| 2018/0278536 A1* | 9/2018 | Haramaty | H04L 47/39 |
| 2018/0329839 A1* | 11/2018 | Durbhakula | G06F 13/1657 |
| 2020/0004700 A1* | 1/2020 | Mathews | G06F 15/167 |
| 2021/0374080 A1* | 12/2021 | Horwich | G06F 12/0862 |

* cited by examiner

900

Adjust, by a controller of a memory device, a value stored in a counter, with the value indicative of a quantity of memory requests that are outstanding at the memory device
902

Transmit, by the controller of the memory device, a credit return based on the value of the counter and at least one threshold
904

MEMORY REQUEST MODULATION

BACKGROUND

Computers, smartphones, and other electronic devices operate using processors and memories. A processor executes code based on data to run applications and provide features to a user. The processor obtains the code and the data from a memory that can store information. As a result, like a processor's speed or number of cores, a memory's type or other characteristics can impact the performance of an electronic device. Different types of memory may have different characteristics. Memory types include volatile memory and nonvolatile memory, such as random access memory (RAM) and flash memory, respectively. RAM can include static RAM (SRAM) and dynamic RAM (DRAM). A solid-state drive (SSD) can be built using, for instance, flash memory.

Demands on the different types of memory continue to evolve and grow. For example, as processors are engineered to execute code faster, such processors can benefit from accessing memories more quickly. Applications may also operate on ever-larger data sets that occupy ever-larger memories. Due to battery-powered electronic devices and power-hungry data centers, energy-usage constraints are becoming more prevalent for memory systems. Further, manufacturers may seek physically smaller memories as the form factors of portable electronic devices continue to shrink. Accommodating these various demands is complicated by the diverse strengths and capabilities of different types of memories.

BRIEF DESCRIPTION OF THE DRAWINGS

Apparatuses of and techniques for memory request modulation are described with reference to the following drawings. The same numbers are used throughout the drawings to reference like features and components:

FIG. 9 illustrates a flow diagram for an example process that implements memory request modulation.

DETAILED DESCRIPTION

Overview

Figure 1:
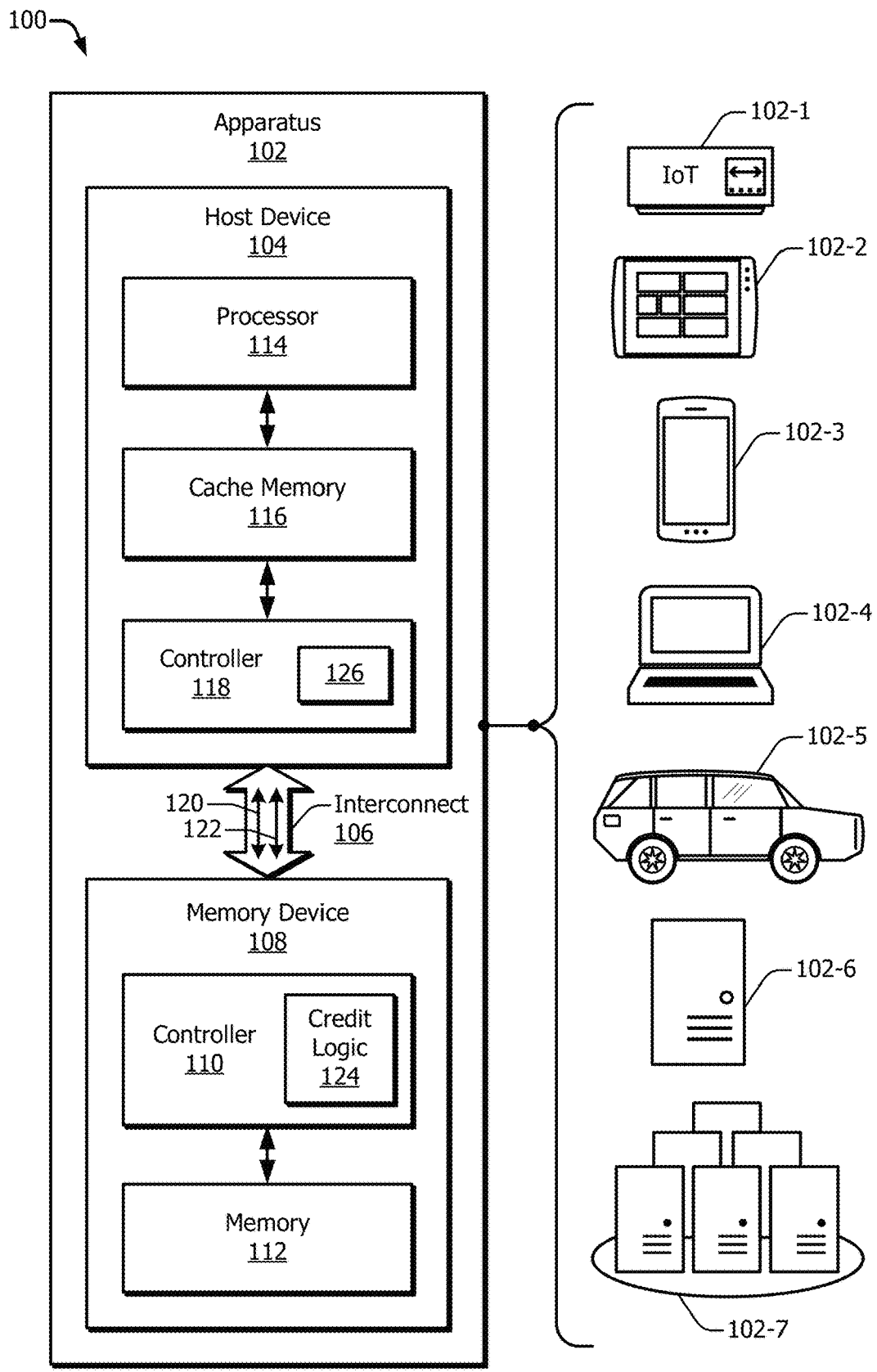
FIG. 1 illustrates example apparatuses that can implement memory request modulation.

Processors and memory work in tandem to provide features to users of computers and other electronic devices. Generally, an electronic device can provide enhanced features, such as high-resolution graphics or artificial intelligence, as a processor and memory operate more quickly together in a complementary manner. Some applications, like those for AI analysis and virtual-reality graphics, can also demand increasing amounts of memory. Such applications use increasing amounts of memory to more accurately model and mimic human thinking and the physical world.

Processors and memories can be secured to a printed-circuit board (PCB), such as a rigid or flexible motherboard. The PCB can include sockets for accepting at least one processor and one or more memories. Wiring infrastructure that enables communication between two or more components can also be disposed on at least one layer of the PCB. This PCB, however, provides a finite area for the sockets and the wiring infrastructure. Some PCBs include multiple sockets that are each shaped as a linear slot and designed to accept a double-inline memory module (DIMM). These sockets can be fully occupied by DIMMs while a processor is still able to utilize more memory. In such situations, the system is capable of performing better if additional memory were available to the processor.

Printed circuit boards may also include at least one peripheral component interconnect (PCI) express (PCI Express®) (PCIe or PCI-E) slot. A PCIe slot is designed to provide a common interface for various types of components that may be coupled to a PCB. Compared to some older standards, PCIe can provider higher rates of data transfer or a smaller footprint on the PCB, including both greater speed and smaller size. Accordingly, certain PCBs enable a processor to access a memory device that is connected to the PCB via a PCIe slot.

In some cases, accessing a memory solely using a PCIe protocol may not offer as much functionality, flexibility, or reliability as is desired. In such cases, another protocol may be layered on top of the PCIe protocol. An example of another, higher-level protocol is the Compute Express Link™ (CXL) protocol. The CXL protocol can be implemented over a physical layer that is governed by the PCIe protocol. The CXL protocol can provide a memory-coherent interface that offers high-bandwidth or low-latency data transfers, including data transfers having both higher bandwidth and lower latency.

Various electronic devices, such as a mobile phone having a processor that is part of a system-on-chip (SoC) or a cloud-computing server having dozens of discrete processing units, may employ memory that is coupled to a processor via a CXL-based interconnect. For clarity, consider an apparatus with a host device that is coupled to a memory device via a CXL-based interconnect. The host device can include a processor and a controller (e.g., a host-side controller) that is coupled to the interconnect. The memory device can include another controller (e.g., a memory-side controller) that is coupled to the interconnect and one or more memory arrays to store information in SRAM, DRAM, flash memory, and so forth.

During operation, the host-side controller issues memory requests to the memory-side controller over the interconnect. The memory request may be or may include a read request or a write request. The memory-side controller receives the memory request via the interconnect and directly or indirectly uses the memory arrays to fulfill the memory request with a memory response. Thus, the memory-side controller sends the memory response to the host-side controller over the interconnect. To fulfill a read request, the memory-side controller returns the requested data with the memory response. As part of fulfilling a write request, the memory-side controller can provide notice that the write operation was successfully completed by transmitting an acknowledgement as the memory response (e.g., with a message such as a subordinate-to-master no-data response completion (S2M NDR Cmp) message).

To increase bandwidth and reduce latency, the memory-side controller can include at least one request queue that may accumulate multiple memory requests (e.g., multiple read requests or multiple write requests) received from the host-side controller. In other words, the host-side controller can send a "subsequent" memory request before receiving a memory response corresponding to a "previous" memory request. This can ensure that the memory device is not waiting idly for another memory request that the host-side controller has already prepared. This technique can also better utilize the interconnect by transmitting the subsequent memory request before the memory response for the previous memory request is ready.

The request queue at the memory-side controller may, however, have space for a finite quantity of entries. If the host-side controller overflows the request queue at the memory-side controller, memory accessing can be slowed, and the overflow may even cause data faults. In other words, without a mechanism to control the flow of memory access requests from the host-side controller to the memory-side controller, memory bandwidth or latency can be degraded. Further, an overwhelmed request queue may even cause errors to occur.

One approach to modulating (e.g., moderating) the flow of memory requests involves using credits. The host-side controller can be granted a particular quantity of credits. A maximum credit quantity may be based, for instance, on a size of the request queue of the memory-side controller. If the host-side controller currently has, or "possesses," at least one credit, then the host-side controller can issue a memory request to the memory-side controller over the interconnect. On the other hand, if the host-side controller has depleted the granted supply of credits, the host-side controller waits until at least one credit has been replenished before issuing another memory request.

The memory-side controller can be responsible for replenishing credits. The memory-side controller can indicate to the host-side controller that one or more credits have been replenished, or "returned," using a communication across the interconnect. For example, a memory response that includes read data or a write acknowledgement can also include a credit return indication. In some cases, the memory-side controller returns a credit responsive to a memory request being removed from the request queue at the memory-side controller. This approach to a credit system can prevent the request queue at the memory-side controller from overflowing and causing an error condition.

This approach may not, however, prevent memory bandwidth from being reduced or latency from increasing due to an oversupply of the total memory requests present at the memory device. This is because a memory device includes "downstream" or "backend" memory components as well as the memory-side controller. In addition to the memory-side controller, the memory device includes one or more memory arrays and may include other components to facilitate memory request processing. For example, the memory device may include at least one "internal" interconnect and one or more memory controllers, which are coupled to the memory arrays to control access thereto. Any of these components may include at least one respective queue, such as an additional memory request queue. For instance, each memory controller of two memory controllers may include a respective memory request queue of two memory request queues.

Responsive to the memory-side controller removing a memory request from its request queue, the memory-side controller forwards the memory request to a downstream or backend component, such as one of the memory controllers. The receiving memory controller may be accumulating memory requests in its respective request queue. This accumulation may occur, for instance, due to a relatively slower memory array that is unable to process requests at the rate at which the requests are being received from the memory-side controller. Thus, the memory-side controller may return a credit to the host-side controller even though un-serviced memory requests are "piling up" within the memory device.

Thus, request queues throughout the memory device may become saturated with memory requests. Allowing the request queues of the memory controllers, or of other backend components, to become saturated can lower the bandwidth throughput of the memory system. The saturation can also increase a length of the latency period between when the memory device accepts a memory request from the host device and when the memory device provides the corresponding memory response. Consequently, returning a credit to the host-side controller each time a memory request is removed from the request queue at the memory-side controller may adversely impact memory system performance.

Further, the memory device may include one or more memory response queues. A memory response queue can be present at the memory-side controller or any of the backend components of the memory device, like a memory controller or a memory array. Oversaturating the response queues can also decrease bandwidth and increase latency. A response queue can become "backed up" if, for instance, an internal interconnect or an external interconnect is too busy or is oversubscribed. For example, the "external" interconnect extending between the host device and the memory device may be oversubscribed by the host device or by other devices (e.g., another PCIe device) that are coupled to the external interconnect. Additionally or alternatively, a relatively fast memory array may be providing memory responses faster than the memory device can empty them from one or more response queues thereof. In such cases, an unbridled credit-return system can cause at least one response queue of the memory device to become filled. A full response queue can further slow the memory device sufficiently to adversely impact bandwidth and latency. Decreased processing bandwidth and increased latency for a memory device may be categorized as poor performance. Slow or otherwise poor memory performance can cause system-wide problems and create user dissatisfaction. Especially if the poor performance conflicts with advertised performance capabilities or a published technical specification, such as a quality-of-service (QoS) indication, the user may blame the manufacturer of the memory device. This can happen even if the host device or another device that is coupled to the interconnect is contributing to the bandwidth and latency issues by overusing the shared external interconnect. Further, this misplaced blame can occur if the host device is sending too many memory requests to the memory device due to an inadequate credit-based communications scheme.

To address this situation, and at least partly ameliorate it, this document describes example approaches to managing the flow of memory requests using a credit-based system. In some implementations, a memory-side controller of a memory device can monitor a quantity of memory requests that are present in the memory device, including in a memory array, a memory controller, or another backend memory component. The memory-side controller can modulate one or more credits being returned to a host-side controller based on the quantity of memory requests that are present in the memory device. Thus, credit returns may be conditioned on how many memory requests are outstanding in the memory device and not only on those memory requests that are within a memory request queue of the memory-side controller.

In other implementations, a memory-side controller of a memory device can include a request queue to store received memory requests and to output multiple memory requests to backend memory components. The memory-side controller can also include a response queue to receive from the backend memory components multiple memory responses corresponding to the multiple memory requests. The memory-side controller can additionally include credit logic having a counter to store a value. The credit logic can adjust the value of the counter to track memory requests. In some cases, the credit logic increments the value responsive to receiving a request for a memory operation (e.g., from a host device) and decrements the value responsive to receipt of a memory response of the multiple memory responses from the backend memory components.

The credit logic can manage credit returns to a host-side controller based on the value stored in the counter and at least one threshold. To do so, the credit logic may block credit returns responsive to the value stored in the counter being greater than the at least one threshold. The credit logic may further permit credit returns responsive to the value stored in the counter being less than the at least one threshold. Multiple thresholds, such as a first threshold and a second threshold, may be used for finer control and/or to address a potential hysteresis effect. In these manners, the value of the counter can indicate a quantity of memory requests that are outstanding at the memory device.

By employing one or more of these implementations, a memory device can obtain greater control over the flow of memory requests received from a host device. The memory device can modulate a quantity of outstanding memory requests and/or a rate at which the memory requests are received from the host device over time. By throttling the arrival of the memory requests, a memory device can avoid becoming so saturated with memory requests that bandwidth or latency is adversely impacted. Thus, using the techniques described herein, manufacturers can produce memory devices that are better able to provide some specified quality of service in terms of bandwidth or latency. Although some implementations are described above in terms of a memory request and a memory device performing certain techniques, other device types may alternatively perform the techniques with requests generally. Examples of non-memory implementations are described further herein.

Example Operating Environments

FIG. 1 illustrates, at 100 generally, example apparatuses 102 that can implement memory request modulation. The apparatus 102 can be realized as, for example, at least one electronic device. Example electronic-device implementations include an internet-of-things (IoTs) device 102-1, a tablet device 102-2, a smartphone 102-3, a notebook computer 102-4 (or a desktop computer), a passenger vehicle 102-5 (or other vehicle), a server computer 102-6, a server cluster 102-7 that may be part of cloud computing infrastructure or a data center, and any portion thereof (e.g., a printed circuit board (PCB) or module component of a device).

Other examples of the apparatus 102 include a wearable device, such as a smartwatch or intelligent glasses; an entertainment device, such as a set-top box or streaming dongle, a smart television, a gaming device, or virtual reality (VR) goggles; a motherboard or blade of a server; a consumer appliance; a vehicle or drone, or the electronic components thereof; industrial equipment; a security or other sensor device; and so forth. Each type of electronic device or other apparatus can include one or more components to provide some computing functionality or feature that is enabled or enhanced by the hardware or techniques that are described herein.

In example implementations, the apparatus 102 can include at least one host device 104, at least one interconnect 106, and at least one memory device 108. The host device 104 can include at least one processor 114, at least one cache memory 116, and at least one controller 118. The memory device 108 may include at least one controller 110 and at least one memory 112. The memory 112 may be realized with one or more memory types.

The memory 112 may be realized, for example, with a dynamic random-access memory (DRAM) die or module, including with a three-dimensional (3D) stacked DRAM device, such as a high bandwidth memory (HBM) device or a hybrid memory cube (HMC) device. DRAM may include, for instance, synchronous DRAM (SDRAM) or double data rate (DDR) DRAM (DDR DRAM). The memory 112 may also be realized using static random-access memory (SRAM). Thus, the memory device 108 may operate as a main memory or a cache memory, including as both. Additionally or alternatively, the memory device 108 may operate as storage memory. In such cases, the memory 112 may be realized, for example, with a storage-class memory type, such as one employing 3D XPoint™ or phase-change memory (PCM), flash memory, a magnetic hard disk, or a solid-state drive (e.g., a Non-Volatile Memory Express® (NVMe®) device).

Regarding the host device 104, the processor 114 can be coupled to the cache memory 116, and the cache memory 116 can be coupled to the controller 118. The processor 114 can also be coupled to the controller 118 directly or indirectly (e.g., via the cache memory 116 as depicted). The host device 104 may include other components to form, for instance, a system-on-a-chip or a system-on-chip (SoC). The processor 114 may include or comprise a general-purpose processor, a central processing unit (CPU), a graphics processing unit (GPU), a neural network engine or accelerator, an application-specific integrated circuit (ASIC), a field-programmable gate array (FPGA) integrated circuit (IC), a communication processor (e.g., a modem or baseband processor), an SoC, and so forth.

In operation, the controller 118 can provide a high-level or logical interface between the processor 114 and at least one memory device, such as a memory that is external to the host device 104. The controller 118 can, for example, receive memory requests from the processor 114 and provide the memory requests to an external memory with appropriate formatting, packaging, timing, reordering, and so forth. The controller 118 can forward to the processor 114 responses to the memory requests that the controller 118 receives from the external memory.

The controller 118 may communicate with multiple memory devices, or other types of devices—some of which may include one or more memory components, over one or more interconnects, such as the interconnect 106. Regarding connections that are external to the host device 104, the host device 104 can be coupled to the memory device 108 via the interconnect 106. The memory device 108 may be coupled to, or may include, a main memory or a storage memory, including both in some cases. Another device, such as a cache memory or a switch, may be coupled between the host device 104 and the memory device 108 and may be part of or separate from the interconnect 106.

The depicted interconnect 106, as well as other interconnects (not shown) that communicatively couple together various components, enables data to be transferred between two or more components of the various components. Interconnect examples include a bus, a switching fabric, a crossbar, one or more wires that carry voltage or current signals, and so forth. Each interconnect may be implemented as a unidirectional interconnect or a bidirectional interconnect. The interconnect 106 can be implemented as a parallel propagation pathway. For example, the interconnect 106 can include at least one command and address bus and at least one data bus, each of which carries multiple bits of a particular item of information (e.g., a data byte) simultaneously each clock period. Alternatively, the interconnect 106 can be implemented as a serial propagation pathway that carries one bit of a particular item of information each clock cycle. For instance, the interconnect 106 can comport with a PCIe standard, such as version 4, 5, 6, or a future version. The interconnect 106 may include multiple serial propagation pathways, such as multiple lanes in a PCIe implementation.

The components of the apparatus 102 that are depicted in FIG. 1 represent an example computing architecture that may include a hierarchical memory system. A hierarchical memory system can include memories at different levels, with each level having a memory with a different speed, capacity, or volatile/nonvolatile characteristic. Thus, the memory device 108 may be described in terms of forming at least part of a main memory of the apparatus 102. The memory device 108 may, however, form at least part of a cache memory, a storage memory, an SoC, and so forth of an apparatus 102.

Although various implementations of the apparatus 102 are depicted in FIG. 1 and described herein, an apparatus 102 can be implemented in alternative manners. For example, the host device 104 may include multiple cache memories, including multiple levels of cache memory, or may omit a cache memory. A memory, such as the memory device 108, may have a respective "internal" or "local" cache memory (not shown). In some cases, the host device 104 may omit the processor 114 and/or include other logic. Generally, the illustrated and described components may be implemented in alternative ways, including in distributed or shared memory systems. A given apparatus 102 may also include more, fewer, or different components than those depicted in FIG. 1 or described herein.

The host device 104 and any of the various memories may be realized in multiple manners. In some cases, the host device 104 and the memory device 108 may be located on separate blades or racks in a server computing environment. In other cases, the host device 104 and the memory device 108 can both be disposed on, or physically supported by, a same printed circuit board (PCB) (e.g., a rigid or flexible motherboard or PCB assembly). The host device 104 and the memory device 108 may also be integrated on a same IC or fabricated on separate ICs but packaged together.

A memory device 108 may also be coupled to multiple host devices 104 via one or more interconnects 106 and may be able to respond to memory requests from two or more of the multiple host devices 104. Each host device 104 may include a respective controller 118, or the multiple host devices 104 may share a common controller 118. An example computing system architecture with at least one host device 104 that is coupled to a memory device 108 is described below with reference to FIG. 2.

With continuing reference to FIG. 1, however, the interconnect 106 may propagate one or more communications. The host device 104 and the memory device 108 may exchange at least one memory request/memory response 120. For example, the controller 118 may transmit a memory request to the controller 110 over the interconnect 106. Thus, the controller 110 may transmit a corresponding memory response to the controller 118 over the interconnect 106. In some cases, the interconnect 106 is operated in accordance with a credit-based protocol. Accordingly, credit-related information 122 may be exchanged between the host device 104 and the memory device 108. For instance, the controller 110 may transmit a credit return to the controller 118 to enable the controller 118 to transmit another memory request.

Thus, the host device 104 and the memory device 108 can communicate using a credit-based protocol. The controller 110 of the memory device 108 can include credit logic 124, and the controller 118 of the host device 104 can include credit logic 126. In example implementations, the credit logic 124 and/or the credit logic 126 can facilitate communication over the interconnect 106 using at least one protocol that operates based on credits.

A credit-based protocol can use tokens or another quantity-based permissions scheme to authorize an initiator and/or a target to communicate with the target and/or the initiator, respectively. For example, the controller 118 may transmit a communication (e.g., a memory request) over the interconnect 106 to the controller 110 responsive to possessing at least one credit that "authorizes" the transmission. This transmission, however, "consumes" the at least one credit. Examples of credit-based protocols are described below with reference to FIGS. 4 and 5.

In example implementations, the credit logic 124 of the controller 110 can moderate the flow of communications from the controller 118. To do so, the credit logic 124 can modulate the frequency or rate at which the credit logic 124 returns credits to the credit logic 126 of the controller 118. Withholding credit returns can slow, or even stop, the transmission of memory requests from the host device 104 to the memory device 108 if the memory device 108 becomes oversaturated with in-progress memory requests. Example techniques for modulating such credit returns are described herein to increase the bandwidth for memory-request processing or to decrease memory response latency, including to achieve both. Example implementations are described further with reference to FIGS. 6-9.

In some implementations, the apparatus 102 operates with one or more protocols over the interconnect 106. The apparatus 102 can operate, for example, a Compute Express Link™ (CXL) protocol across the interconnect 106. In at least some of these cases, the apparatus 102 can overlay the CXL protocol on top of a PCIe protocol for the physical layer. Thus, the controller 118 can comport with a CXL standard or a PCIe standard, including comporting with both. Similarly, the controller 110 can comport with a CXL standard or a PCIe standard, including with both. Examples of credit-based aspects of at least one version of a CXL standard are described below with reference to FIGS. 4 and 5. Other circuitry, techniques, and mechanisms are also described below. Next, however, example computing architectures with one or more processors and a memory device are described next.

Figure 2:
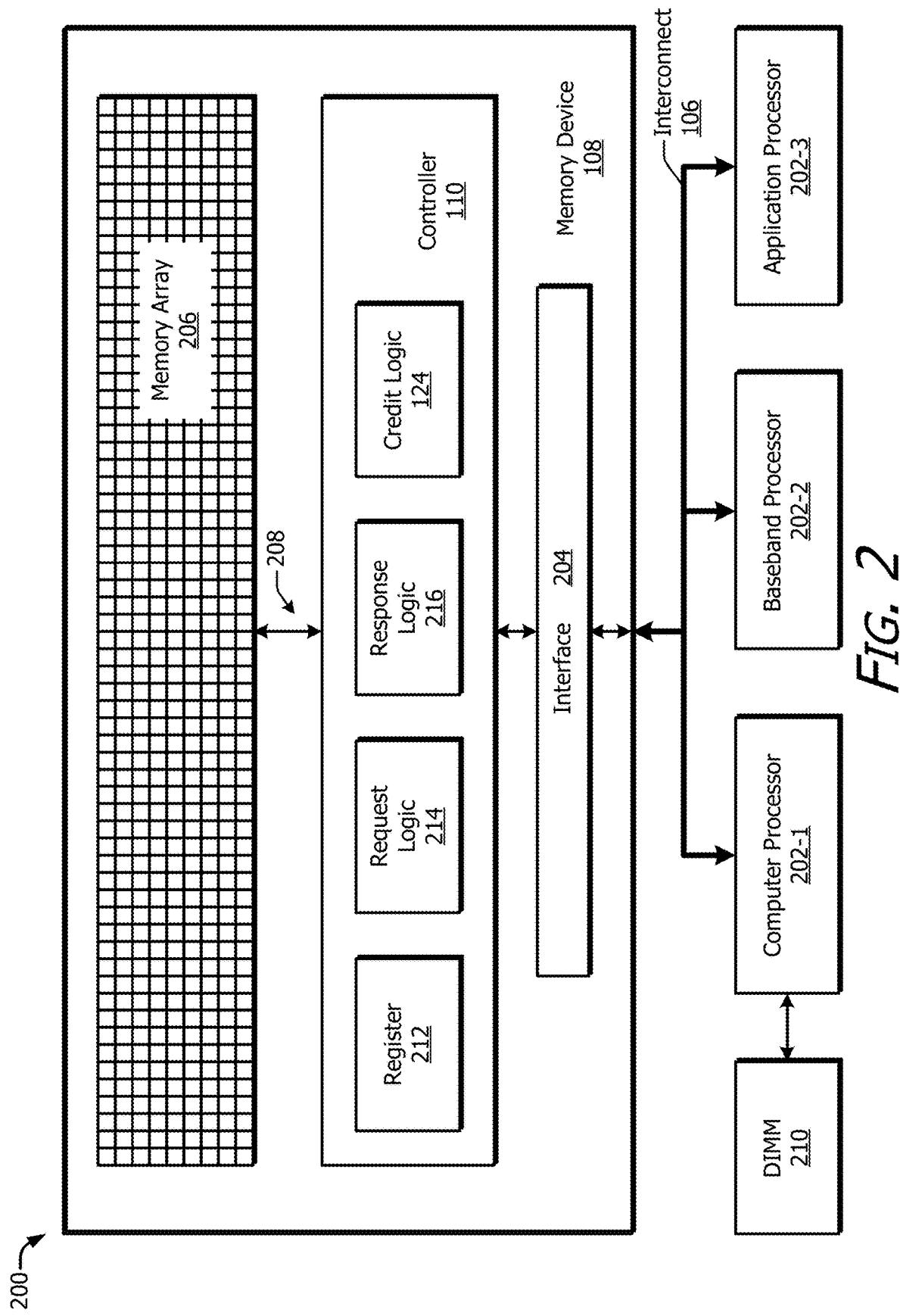
FIG. 2 illustrates example computing systems that can implement aspects of memory request modulation with a memory device.

FIG. 2 illustrates an example computing system 200 that can implement aspects of memory request modulation with a memory device. In some implementations, the computing system 200 includes at least one memory device 108, at least one interconnect 106, and at least one processor 202. The memory device 108 can include, or be associated with, at least one memory array 206, at least one interface 204, and at least one controller 110. The at least one controller 110 can be communicatively coupled to the memory array 206 via at least one interconnect 208 (e.g., an "internal" interconnect). The memory array 206 and the controller 110 may be components that are integrated on a single semiconductor die or that are located on separate semiconductor dies (e.g., but still coupled to or disposed on a same PCB). Each of the memory array 206 or the controller 110 may also be distributed across multiple dies.

The memory device 108 can correspond, for example, to one or more of a cache memory, main memory, or storage memory of the apparatus 102 of FIG. 1. Thus, the memory array 206 can include an array of memory cells. These memory cells can include, but are not limited to, memory cells of Static Random-Access Memory (SRAM), Dynamic Random-Access Memory (DRAM), Synchronous DRAM (SDRAM), three-dimensional (3D) stacked DRAM, Double Data Rate (DDR) memory, low-power Dynamic Random-Access Memory (DRAM), Low-Power Double Data Rate (LPDDR) Synchronous Dynamic Random-Access Memory (SDRAM), phase-change memory (PCM), or flash memory.

The controller 110 can include any one or more of a number of components that can be used by the memory device 108 to perform various operations. These operations can include communicating with other devices, managing performance, modulating memory access rates, and performing memory read or write operations. For example, the controller 110 can include at least one register 212, at least one instance of request logic 214, at least one instance of response logic 216, and at least one instance of credit logic 124.

The register 212 may be implemented, for example, as one or more registers that can store information to be used by the controller 110, by another part of the memory device 108, or by a part of a host device 104, such as a controller 118 as depicted in FIG. 1. A register 212 may store, for instance, a maximum credit level, a parameter controlling a communication-flow modulation process using credits (e.g., a threshold, like threshold 618 of FIG. 6, or a flag controlling a state of a gate or switch, like gate 612 of FIG. 6 or switch 716 of FIG. 7), and so forth. The request logic 214 can process one or more memory requests, such as by formulating a request, directing a request to a next or final destination, or performing a memory access operation (e.g., a read or a write operation).

The response logic 216 can prepare at least one memory response, such as by obtaining requested data or generating a write acknowledgement. The credit logic 124 can modulate the flow of memory requests across the interconnect 106 using credits, which are described further below, including with reference to FIG. 4. Although depicted separately, the components of the controller 110 may be nested with respect to each other, may be at least partially overlapping with another component, and so forth.

The interface 204 can couple the controller 110 or the memory array 206 directly or indirectly to the interconnect 106. As shown in FIG. 2, the register 212, the request logic 214, the response logic 216, and the credit logic 124 can be part of a single component (e.g., the controller 110). In other implementations, one or more of the register 212, the request logic 214, the response logic 216, or the credit logic 124 may be implemented as separate components, which can be provided on a single semiconductor die or disposed across multiple semiconductor dies. These components of the controller 110 may be individually or jointly coupled to the interconnect 106 via the interface 204.

The interconnect 106 may be implemented with any one or more of a variety of interconnects that communicatively couple together various components and enable commands, addresses, messages, packets, and/or other information and data to be transferred between two or more of the various components (e.g., between the memory device 108 and any of the one or more processors 202). The information and data may be propagated over the interconnect 106 "directly" or using some form of encapsulation or packaging, such as with packets, frames, or flits. Although the interconnect 106 is represented with a single line or arrow in FIG. 2, the interconnect 106 may include at least one bus, at least one switching fabric, at least one crossbar, one or more wires or traces that carry voltage or current signals, at least one switch, one or more buffers, at least one lane, and so forth.

In some aspects, the memory device 108 may be realized as a "separate" physical component relative to the host device 104 (of FIG. 1) or any of the processors 202. Examples of physical components that may be separate include, but are not limited to, a printed circuit board (PCB), which can be rigid or flexible; a memory card; a memory stick; and a memory module, including a single in-line memory module (SIMM), a dual in-line memory module (DIMM), or a non-volatile memory express (NVMe) module. Thus, separate physical components may be located together within a same housing of an electronic device or a memory product, or such physical components may be distributed over a server rack, a data center, and so forth. Alternatively, the memory device 108 may be packaged or integrated with other physical components, including a host device 104 or a processor 202, such as by being disposed on a common PCB, combined together in a single device package, or integrated into an SoC of an apparatus.

As shown in FIG. 2, the one or more processors 202 may include a computer processor 202-1, a baseband processor 202-2, and an application processor 202-3, which are coupled to the memory device 108 through the interconnect 106. The processors 202 may each be, or may form a part of, a CPU, a GPU, an SoC, an ASIC, an FPGA, or the like. In some cases, a single "processor" can comprise multiple processing cores or resources, each dedicated to different functions, such as modem management, applications, graphics, central processing, neural network acceleration, or the like. In some implementations, the baseband processor 202-2 may include or be coupled to a modem (not shown in FIG. 2) and may be referred to as a modem processor. The modem and/or the baseband processor 202-2 may be coupled wirelessly to a network via, for example, cellular, Wi-Fi®, Bluetooth®, ultra-wideband (UWB), near field, or another technology or protocol for wireless communication.

In various implementations, the processors 202 may be connected to different memories in different manners. For example, the processors 202 may be connected directly to the memory device 108 (e.g., via the interconnect 106 as shown). Alternatively, one or more of the processors 202 may be indirectly connected to the memory device 108, such as over a network connection, through one or more other devices or components, and/or using at least one other interconnect. Each processor 202 may be realized similarly to the processor 114 of FIG. 1. Accordingly, a respective processor 202 can include or be associated with a respective controller, like the controller 118 depicted in FIG. 1. Alternatively, two or more processors 202 may access the memory device 108 using a shared or system controller 118. In any of such cases, the controller 118 may include credit logic 126 (e.g., of FIG. 1). Each processor 202 may also be separately connected to a respective memory. As shown, the computer processor 202-1 may be coupled to at least one DIMM 210 that is inserted into a DIMM slot of a motherboard. The DIMM 210 can be coupled to a memory controller (not shown), which may be part of the computer processor 202-1.

The apparatuses and methods that are described herein may be appropriate for memory that is designed for use with a PCIe bus. Thus, the described principles may be incorporated into a memory device with a PCIe interface. Further, the memory device can communicate over the interconnect 106 by overlaying a CXL protocol on the physical PCIe interface. An example of a memory standard that relates to CXL is promulgated by the Compute Express Link consortium and may include versions 1.0, 1.1, 2.0, and future versions. Thus, the host device 104 or the memory device 108, including both in some cases, may comport with at least one CXL standard. Accordingly, some terminology in this document may draw from one or more of these standards or versions thereof for clarity. The described principles, however, are also applicable to memories that comport with other standards, including earlier versions or future versions of such standards, and to memories that do not adhere to a public standard. Examples of systems that may include a PCIe interface and a CXL protocol overlay are described next with reference to FIG. 3.

Figure 3:
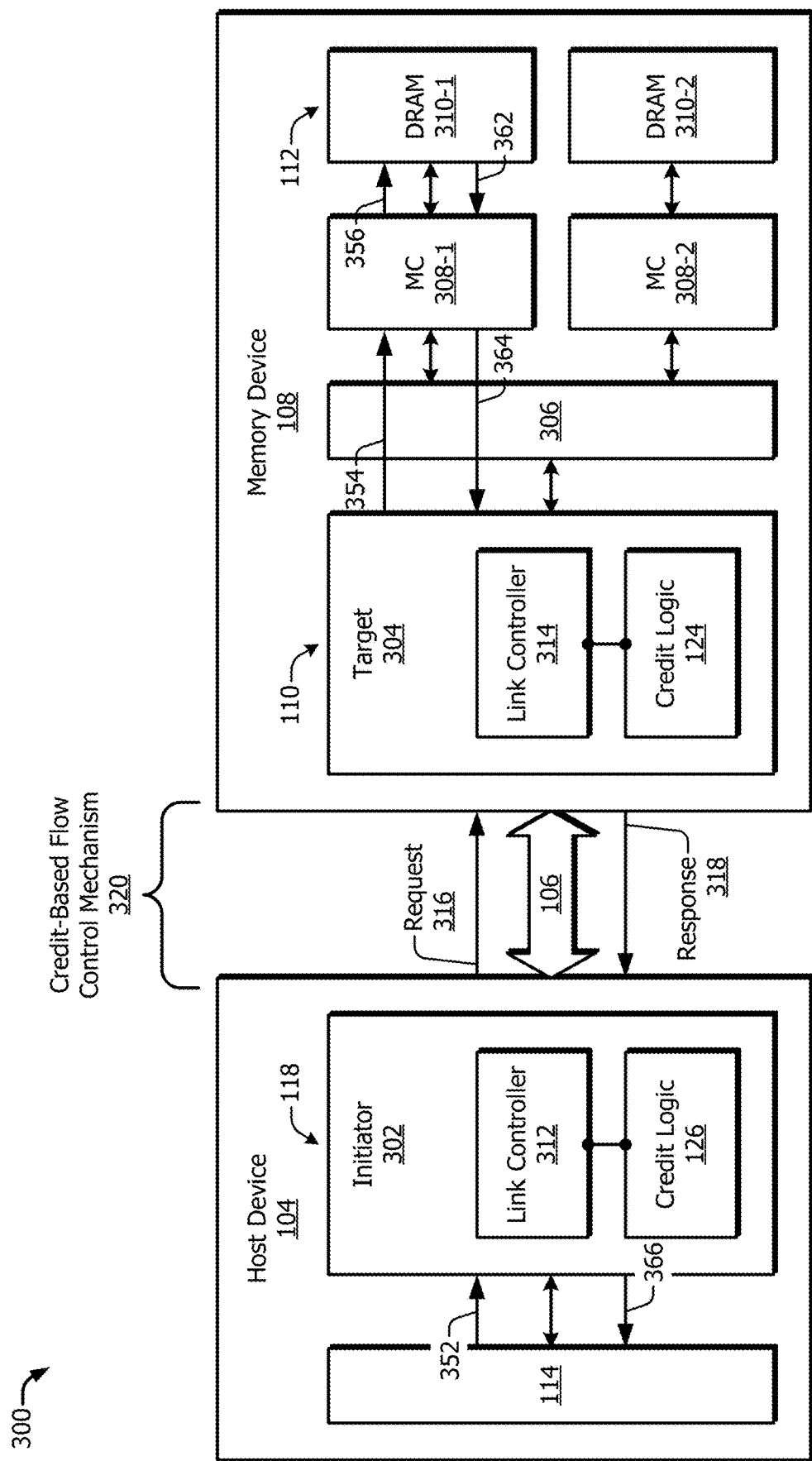
FIG. 3 illustrates examples of a system that can include a host device and a memory device coupled together via an interconnect.

FIG. 3 illustrates examples of a system 300 that can include a host device 104 and a memory device 108 that are coupled together via an interconnect 106. The system 300 may form at least part of an apparatus 102 as shown in FIG. 1. As illustrated in FIG. 3, the host device 104 includes a processor 114 and a controller 118, which can be realized with at least one initiator 302. Thus, the initiator 302 can be coupled to the processor 114 or to the interconnect 106 (including to both), and the initiator 302 can be coupled between the processor 114 and the interconnect 106. Examples of initiators 302 may include a leader, a primary, a master, a requester or requesting component, a main component, and so forth.

In the illustrated example system 300, the memory device 108 includes a controller 110, which can be realized with at least one target 304. The target 304 can be coupled to the interconnect 106. Thus, the target 304 and the initiator 302 can be coupled to each other via the interconnect 106. Examples of targets 304 may include a follower, a secondary, a slave, a subordinate, a responder or responding component, a subsidiary component, and so forth. The memory device 108 also includes a memory 112. The memory 112 can be realized with at least one memory module or chip or with a memory array 206 (of FIG. 2) or another component, such as a DRAM 310, as is described below.

In example implementations, the initiator 302 includes at least one link controller 312, and the target 304 includes at least one link controller 314. The link controller 312 or the link controller 314 can instigate, coordinate, cause, or otherwise participate in or control signaling across a physical or logical link realized by the interconnect 106 in accordance with one or more protocols. The link controller 312 may be coupled to the interconnect 106. The link controller 314 may also be coupled to the interconnect 106. Thus, the link controller 312 can be coupled to the link controller 314 via the interconnect 106. Each link controller 312 or 314 may, for instance, control communications over the interconnect 106 at a link layer or at one or more other layers of a given protocol. Communication signaling may include, for example, a request 316, a response 318, and so forth.

The memory device 108 may further include at least one interconnect 306 and at least one memory controller 308 (MC 308). Within the memory device 108, and relative to the target 304, the interconnect 306, the memory controller 308, and/or the DRAM 310 (or other memory component) may be referred to as a "backend" or "downstream" component of the memory device 108. In some cases, the interconnect 306 is internal to the memory device 108 and may operate the same as or differently from the interconnect 106.

Thus, the memory device 108 can include at least one memory component. As shown, the memory device 108 may include multiple memory controllers 308-1 and 308-2 and/or multiple DRAMs 310-1 and 310-2. Although two of each are shown, the memory device 108 may include one or more than two memory controllers and/or one or more than two DRAMs. For example, a memory device 108 may include 4 memory controllers and 16 DRAMs, such as 4 DRAMs per memory controller. The memory 112 or memory components of the memory device 108 are depicted as DRAM as an example only, for one or more of the memory components may be implemented as another type of memory. For instance, the memory components may include nonvolatile memory like flash or PCM. Alternatively, the memory components may include other types of volatile memory like SRAM. Thus, the memory device 108 may include a dynamic random-access memory (DRAM) array, a static random-access memory (SRAM) array, or a nonvolatile memory array. A memory device 108 may also include any combination of memory types.

In some cases, the memory device 108 may include the target 304, the interconnect 306, the at least one memory controller 308, and the at least one DRAM 310 within a single housing or other enclosure. The enclosure, however, may be omitted or may be merged with one for the host device 104, the system 300, or an apparatus 102 (of FIG. 1). The interconnect 306 can be disposed on a PCB. Each of the target 304, the memory controller 308, and the DRAM 310 may be fabricated on at least one IC and packaged together or separately. The packaged IC(s) may be secured to or otherwise supported by the PCB (or PCB assembly) and may be directly or indirectly coupled to the interconnect 306. The components of the memory device 108 may, however, be fabricated, packaged, combined, and/or housed in other manners.

As illustrated in FIG. 3, the target 304, including the link controller 314 thereof, can be coupled to the interconnect 306. Each memory controller 308 of the multiple memory controllers 308-1 and 308-2 can also be coupled to the interconnect 306. Accordingly, the target 304 and each memory controller 308 of the multiple memory controllers 308-1 and 308-2 can communicate with each other via the interconnect 306. Each memory controller 308 is coupled to at least one DRAM 310. As shown, each respective memory controller 308 of the multiple memory controllers 308-1 and 308-2 is coupled to at least one respective DRAM 310 of the multiple DRAMs 310-1 and 310-2. Each memory controller 308 of the multiple memory controllers 308-1 and 308-2 may, however, be coupled to a respective set of multiple DRAMs or other memory components.

Each memory controller 308 can access at least one DRAM 310 by implementing one or more memory access protocols to facilitate reading or writing data based on at least one memory address. The memory controller 308 can increase bandwidth or reduce latency for the memory accessing based on a type of the memory or an organization of the memory components, such as the multiple DRAMs. The multiple memory controllers 308-1 and 308-2 and the multiple DRAMs 310-1 and 310-2 can be organized in many different manners. For example, each memory controller 308 can realize one or more memory channels for accessing the DRAMs. Further, the DRAMs can be manufactured to include one or more ranks, such as a single-rank or a dual-rank memory module. Each DRAM 310 (e.g., at least one DRAM IC chip) may also include multiple banks, such as 8 or 16 banks.

This document now describes examples of the host device 104 accessing the memory device 108. The examples are described in terms of a general memory access (e.g., a memory request) which may include a memory read access (e.g., a memory read request for a data retrieval operation) or a memory write access (e.g., a memory write request for a data storage operation). The processor 114 can provide a memory access request 352 to the initiator 302. The memory access request 352 may be propagated over a bus or other interconnect that is internal to the host device 104. This memory access request 352 may be or may include a read request or a write request. The initiator 302, such as the link controller 312 thereof, can reformulate the memory access request 352 into a format that is suitable for the interconnect 106. This reformulation may be performed based on a physical protocol or a logical protocol (including both) applicable to the interconnect 106. Examples of such protocols are described below.

The initiator 302 can thus prepare a request 316 and transmit the request 316 over the interconnect 106 to the target 304. The target 304 receives the request 316 from the initiator 302 via the interconnect 106. The target 304, including the link controller 314 thereof, can process the request 316 to determine (e.g., extract, decode, or interpret) the memory access request. Based on the determined memory access request, the target 304 can forward a memory request 354 over the interconnect 306 to a memory controller 308, which is the first memory controller 308-1 in this example. For other memory accesses, the targeted data may be accessed with the second DRAM 310-2 through the second memory controller 308-2. Thus, the first memory controller 308-1 receives the memory request 354 via the internal interconnect 306.

The first memory controller 308-1 can prepare a memory command 356 based on the memory request 354. The first memory controller 308-1 can provide the memory command 356 to the first DRAM 310-1 over an interface or interconnect appropriate for the type of DRAM or other memory component. The first DRAM 310-1 receives the memory command 356 from the first memory controller 308-1 and can perform the corresponding memory operation. Based on the results of the memory operation, the first DRAM 310-1 can generate a memory response 362. If the memory request 316 is for a read operation, the memory response 362 can include the requested data. If the memory request 316 is for a write operation, the memory response 362 can include an acknowledgement that the write operation was performed successfully. The first DRAM 310-1 can provide the memory response 362 to the first memory controller 308-1.

The first memory controller 308-1 receives the memory response 362 from the first DRAM 310-1. Based on the memory response 362, the first memory controller 308-1 can prepare a memory response 364 and transmit the memory response 364 to the target 304 via the interconnect 306. The target 304 receives the memory response 364 from the first memory controller 308-1 via the interconnect 306. Based on this memory response 364, and responsive to the corresponding request 316, the target 304 can formulate a response 318 for the requested memory operation. The response 318 can include read data or a write acknowledgement and be formulated in accordance with one or more protocols of the interconnect 106.

To respond to the memory request 316 from the host device 104, the target 304 of the memory device 108 can transmit the response 318 to the initiator 302 over the interconnect 106. Thus, the initiator 302 receives the response 318 from the target 304 via the interconnect 106. The initiator 302 can therefore respond to the "originating" memory access request 352, which is from the processor 114 in this example. To do so, the initiator 302 prepares a memory access response 366 using the information from the response 318 and provides the memory access response 366 to the processor 114. In these manners, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 302 and the target 304. Generally, the interconnect 106 can carry memory-related information, such as data or a memory address, between the initiator 302 and the target 304. In some cases, the initiator 302 or the target 304 (including both) can prepare memory-related information for communication across the interconnect 106 by encapsulating such information. The memory-related information can be encapsulated or incorporated into, for example, at least one packet (e.g., at least one flit). One or more packets may include at least one header with information indicating or describing the content of each packet.

In example implementations, the interconnect 106 can support, enforce, or enable memory coherency for a shared memory system, for a cache memory, for combinations thereof, and so forth. Thus, the memory device 108 can operate in a cache coherent memory domain in some cases. Additionally or alternatively, the interconnect 106 can be operated based on a credit allocation system. Thus, the initiator 302 and the target 304 can communicate using, for example, a credit-based flow control mechanism 320. Possession of a credit can enable an entity, such as the initiator 302, to transmit another memory request 316 to the target 304. The target 304 may return credits to "refill" a credit balance at the initiator 302. The credit logic 124 of the target 304 or the credit logic 126 of the initiator 302 (including both instances of credit logic working together in tandem) can implement a credit-based communication scheme across the interconnect 106. Example aspects of credit-based communication protocols are described below with reference to FIGS. 4 and 5.

The system 300, the initiator 302 of the host device 104, or the target 304 of the memory device 108 may operate or interface with the interconnect 106 in accordance one or more physical or logical protocols. For example, the interconnect 106 may be built in accordance with a Peripheral Component Interconnect Express® (PCIe or PCI-E) standard. Applicable versions of the PCIe standard may include 1.x, 2.x, 3.x, 4.0, 5.0, 6.0, and future or alternative versions of the standard.

In some cases, at least one other standard is layered over the physical-oriented PCIe standard. For example, the initiator 302 or the target 304 can communicate over the interconnect 106 in accordance with a Compute Express Link™ (CXL) standard. Applicable versions of the CXL standard may include 1.x, 2.0, and future or alternative versions of the standard. Thus, the initiator 302 and/or the target 304 may operate so as to comport with a PCIe standard and/or a CXL standard. A device or component may comprise or operate in accordance with a CXL Type 1, 2, or 3 device. A CXL standard may operate based on credits, such as request credits, response credits, and data credits. Example aspects of credit types, credit allocation, credit usage, and flow control via credits are described next with reference to FIGS. 4 and 5.

Example Techniques and Hardware

Figure 4:
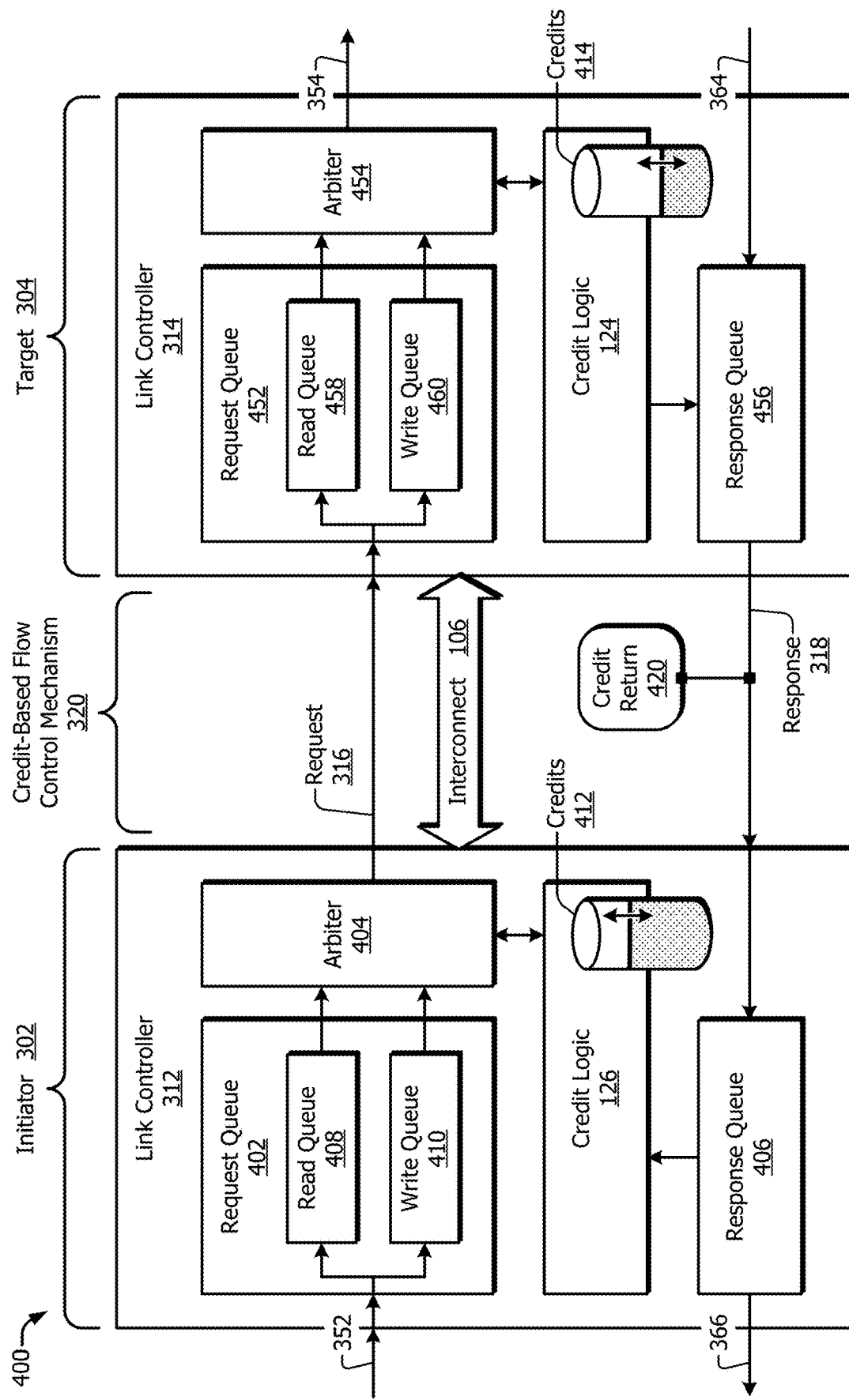
FIG. 4 illustrates examples of controllers for an initiator and a target that can communicate across an interconnect that employs a credit-based protocol.

FIG. 4 illustrates, at 400 generally, examples of controllers for an initiator 302 and a target 304 that can communicate across an interconnect 106 that employs a credit-based protocol. The initiator 302 can include a link controller 312, and the target 304 can include a link controller 314. As also shown in FIGS. 1 and 3, the link controller 312 can include credit logic 126, and the link controller 314 can include credit logic 124. The credit logic 124 and the credit logic 126 can support implementations of a credit-based flow control mechanism 320 that authorizes or permits one or more communications based on possession of at least one credit.

In example implementations, the link controller 312 or the link controller 314, including both link controllers, can communicate across the interconnect 106 in accordance with a credit-based protocol. A credit-based protocol can be realized using, for instance, the credit-based flow control mechanism 320. To do so, the credit logic 126 can monitor a quantity of one or more credits 412, and the credit logic 124 can monitor one or more credits 414. Generally, the credit logic 126 permits the link controller 312 to transmit a communication, such as a request 316, to the link controller 314 based on the one or more credits 412. Transmitting the request 316 may use or "consume" one credit of the one or more credits 412. Based on the one or more credits 414 that are to be returned, the credit logic 124 at the link controller 314 can modulate the rate of transmission from the link controller 312 by managing the transmission of at least one credit return 420. The credit return 420 can replenish an indicated quantity of the one or more credits 412 at the credit logic 126. This credit usage is described further below.

As illustrated in FIG. 4, the link controller 312 can include at least one request queue 402, at least one arbiter 404, at least one response queue 406, and at least one instance of the credit logic 126. The link controller 314 can include at least one request queue 452, at least one arbiter 454, at least one response queue 456, and at least one instance of the credit logic 124. In some cases, a request queue 402 or 452 may be split into a read path and a write path. Thus, the request queue 402 may include at least one read queue 408 and at least one write queue 410. Similarly, the request queue 452 may include at least one read queue 458 and at least one write queue 460.

In example operations for an initiator 302, the link controller 312 can receive a memory access request 352 at the request queue 402. The request queue 402 routes the request into the read queue 408 or the write queue 410 based on whether the memory access request is for a read operation or a write operation, respectively. The arbiter 404 controls access to the interconnect 106 based on instructions or commands from the credit logic 126. The credit logic 126 authorizes the arbiter 404 to transmit a request 316 over the interconnect 106 based on possession of the one or more credits 412. For example, the credit logic 126 may permit the arbiter 404 to transmit one request 316 per one available credit 412 (e.g., a one-to-one ratio of transmissions and credits). If the credit logic 126 does not currently possess any credits 412, the arbiter 404 can be prevented from transmitting a request 316 (e.g., by the credit logic 126 blocking or not authorizing such a transmission).

The response queue 406 can buffer multiple responses 318 received from the link controller 314 via the interconnect 106. Each response 318 may include a least one memory response (e.g., with read data or a write acknowledgment) or at least one credit return 420. Thus, a response 318 may include a memory response and a credit return 420. For a memory response, the response queue 406 buffers the response until the response queue 406 can provide the memory access response 366 to the processor 114 (of FIGS. 1 and 3). For a credit return 420, the response queue 406, including associated logic, can forward the quantity of credits returned 420 to the credit logic 126. Alternatively, separate circuitry may provide the credit return 420 to the credit logic 126. Based on the credit return 420, the credit logic 126 can replenish at least a portion of the credits 412.

Continuing with example operations, but for a target 304, the link controller 314 can receive the request 316 at the request queue 452. The request queue 452 can then route the request 316 into the read queue 458 or the write queue 460 depending on whether it is a read request or a write request, respectively. The arbiter 454 can select a read request from the read queue 458 or a write request from the write queue 460 for transmission as the memory request 354 to a downstream component, such as a memory controller. Responsive to transmission of a memory request 354, which corresponds to a request 316 that was stored in the request queue 452, the arbiter 454 notifies the credit logic 124 that the request 316 has been transmitted to a downstream component of the memory device 108 (e.g., of FIGS. 1-3). Accordingly, the credit logic 124 can add a credit 414 to the collection of one or more credits 414 that are earmarked to be returned to the link controller 312.

Thus, the credit logic 124 can track (e.g., maintain a record of) how many credits 414 can be returned to the credit logic 126 because the link controller 314 has forwarded a corresponding request 316 from the request queue 452 to a downstream component of the memory device 108. The credit logic 124 can communicate with the response queue 456 responsive to the presence of credits 414 that are to be returned to the credit logic 126. When a memory response 364 is received at the response queue 456, the response queue 456 can store the memory response 364. In conjunction with transmitting the memory response 364 as a response 318 to the link controller 312, the response queue 456 can include at least one credit return 420 (e.g., in a same FLIT or other packet). The credit return 420 can indicate a quantity of one or more credits 414 that are being returned to the credit logic 126 to increase the quantity of credits 412.

In these manners, the link controller 314 can use the credit-based protocol to control (e.g., block, gate, modulate, or moderate) the flow of requests 316 from the link controller 312. This can enable the link controller 314 to prevent the request queue 452 from overflowing from receiving too many requests 316 (e.g., from receiving requests 316 faster than the requests can be forwarded to downstream memory components). Additionally or alternatively, a credit-based protocol can also be used to control the flow of responses 318 from the link controller 314 to the link controller 312. The response queue 456 of the link controller 314 may be blocked from transmitting a response 318 unless the credit logic 124 has a "response" credit (not separately shown in FIG. 4) to authorize such a response transmission. These response credits may be different from the one or more "request" credits 414 relating to the requests 316. In such scenarios, the credit logic 126 of the link controller 312 may return the response credits to the credit logic 124 responsive to issuances of memory access responses 366 from the response queue 406. Hence, the initiator 302 and the target 304 can implement the credit-based flow control mechanism 320 bidirectionally.

Various approaches can be employed for a credit-based communication protocol. For example, a credit may correspond to a transmission across an interconnect, to a packet, to a flit, or to a request or response. A single credit may correspond to a single instance of any of the preceding examples or to multiple instances of such examples. In some cases a transmission may include multiple requests and/or multiple responses, such as by encapsulating them into a packet or flit. In some systems, a credit may correspond generally to any type of request or response so that, e.g., an initiator can transmit any kind of request or response if the initiator possesses a credit. Additionally or alternatively, a credit may be specific to one or more types of requests or responses or other communications. Examples of communication types include read-related requests and write-related requests. Credits may also be particular to whether or not data is allowed to be included in the corresponding transmission. These and other communication traits may be further combined to create still-more specific types of credits.

By way of example, but not limitation, this document describes some implementations in terms of a credit protocol employed by certain CxL systems. Generally, the credit-based flow control mechanism for CXL can employ "backpressure" against a host device if one or more buffers of the memory device are full and therefore cannot receive any more requests (or any more responses on the return path). In some example systems, there can be three types of credits on an initiator device or a target device to control the flow of traffic between them. These three credit types can be represented by ReqCrd, DataCrd, and RspCrd. More specifically, these three examples are a request credit (ReqCrd), a data credit (DataCrd), and a response credit (RspCrd).

This document now describes example traffic classifications. For communications from the initiator to the target (e.g., from a host device to a memory device), two traffic classifications are:
 REQ: Request without Data—generally Read Requests. These can be controlled using ReqCrd.
 RwD: Request with Data—generally Write Requests. These can be controlled using DataCrd.
For communications from the target to the initiator (e.g., from the memory device to the host device), two traffic classifications are:
 DRS: Response with Data—generally Read Responses. These can be controlled using DataCrd.
 NDR: Response without Data—generally Write Acknowledgements. These can be controlled using RspCrd.

These example CXL terms can be applied to the general system of FIG. 4. At a host device, which can be represented by the initiator 302, the credit logic 126 decrements the ReqCrd value (e.g., a quantity for the one or more credits 412) responsive to forwarding a FLIT (e.g., a flit with one read request) across the interconnect 106 to the target 304. If the ReqCrd value reaches zero, the credit logic 126 causes the arbiter 404 to cease sending FLITs (e.g., the credit logic 126 blocks transmission of further read requests). At a memory device, which can be represented by the target 304, the link controller 314 processes the received FLIT. The arbiter 454 forwards a request 316 that was included in the FLIT to backend memory as a read or write memory request 354 (e.g., a read request for a ReqCrd example). The credit logic 124 increments the ReqCrd value (e.g., the quantity of the collection of credits 414 that are to be returned) responsive to the forwarding of the memory request 354.

The link controller 314 return the request credits (ReqCrd) accumulated at the credit logic 124 to the credit logic 126 with at least one response 318. This credit return 420 may be associated with a decrement of the ReqCrd at the credit logic 124 and an increment of the ReqCrd at the credit logic 126. In some locations of this document, "credits" and credit-related communications may be described with reference to a CXL standard. Nonetheless, implementations of memory request modulation, as described in this document, can apply to and benefit other credit-based systems that operate in a similar or analogous manner.

Figure 5:
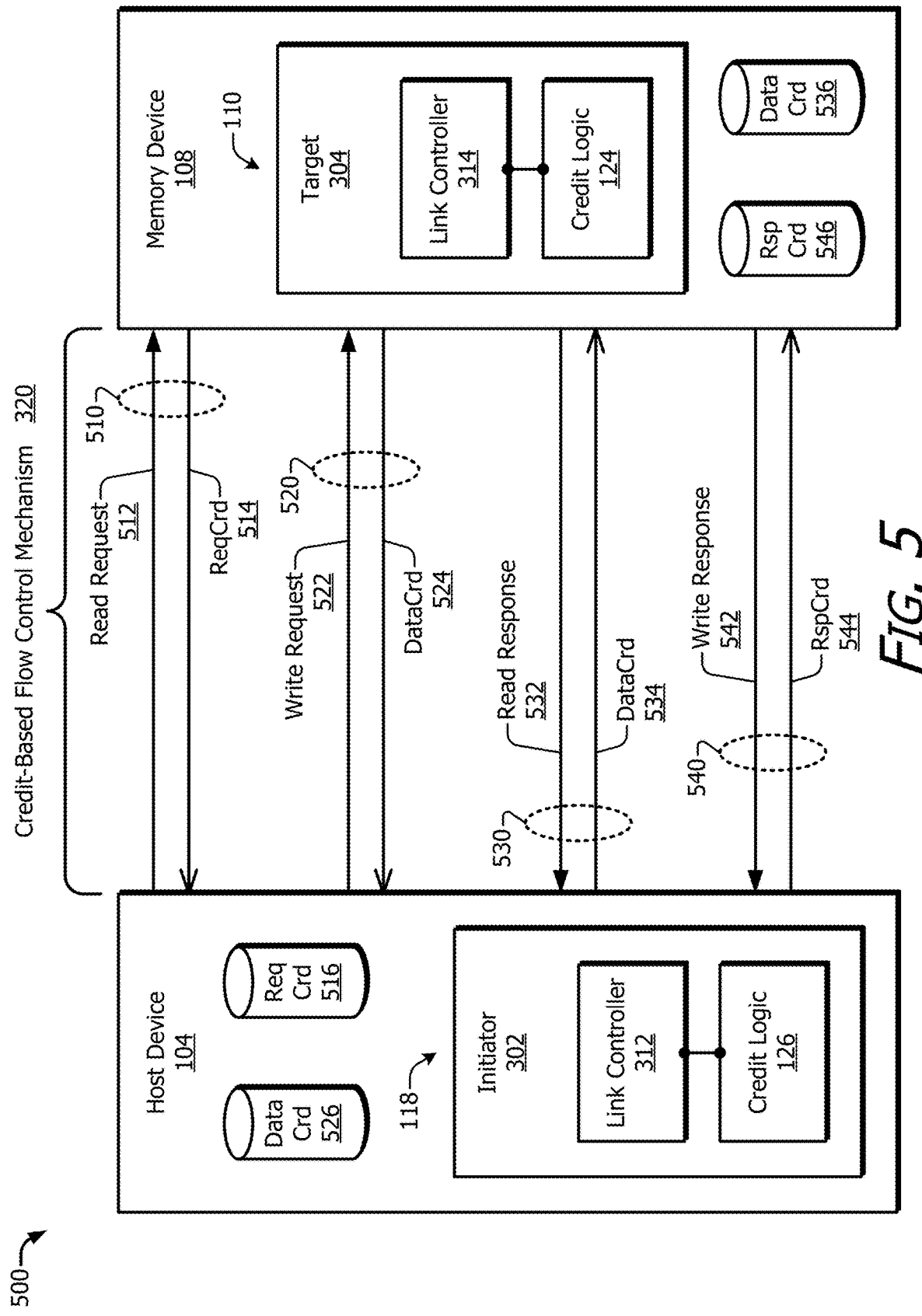
FIG. 5 illustrates examples of credit-based feedback loops to control communication flows between two or more devices.

FIG. 5 illustrates, at 500 generally, examples of credit-based feedback loops to control communication flows between two or more devices. In example implementations, the two or more devices can include a host device 104 and a memory device 108. The two or more devices may comport with at least one CXL standard that includes memory requests and memory responses. Four example credit-based feedback loops 510, 520, 530, and 540 are shown. Each credit-based feedback loop includes an active or affirmative communication, such as a memory request or a memory response, and an associated credit return. The affirmative communication can include a read or write request or a read or write response. The credit return can correspond to a request credit (ReqCrd), a response credit (RspCrd), or a data credit (DataCrd).

In a first example, the credit-based feedback loop 510 includes a read request 512 and a request credit 514. In operation, the host device 104 transmits the read request 512 to the memory device 108. In response to the link controller 314 forwarding the read request 512 to one or more downstream components of the memory device 108, the credit logic 124 can return the request credit 514 to the initiator 302. Responsive to return of the request credit 514, the credit logic 126 adds another request credit to the request credit repository or count 516. While the request credit count 516 is greater than zero (or the request credit repository 516 is nonempty), the credit logic 126 can permit the link controller 312 to transmit another read request 512. In this manner, the link controller 314 of the target 304 can provide feedback or backpressure to the link controller 312 of the initiator 302 to control (e.g., block, slow, increase/decrease, or otherwise modulate) a flow of the read requests 512.

In a second example, the credit-based feedback loop 520 includes a write request 522 and a data credit 524. In operation, the host device 104 transmits the write request 522 to the memory device 108. In response to the link controller 314 forwarding the write request 522 to one or more downstream components of the memory device 108, the credit logic 124 can return the data credit 524 to the initiator 302. Responsive to return of the data credit 524, the credit logic 126 adds another data credit to the data credit repository or count 526. While the data credit count 526 is greater than zero (or the data credit repository 526 is nonempty), the credit logic 126 can permit the link controller 312 to transmit another write request 522. In this manner, the link controller 314 of the target 304 can provide feedback or backpressure to the link controller 312 to control (e.g., block, slow, increase/decrease, or otherwise modulate) a flow of the write requests 522.

The first and second examples above relate to the target 304 controlling a communication flow (e.g., of memory requests) from the initiator 302. The credit-based feedback loops can, however, operate in the opposite direction. The third and fourth examples below relate to the initiator 302 controlling a communication flow (e.g., of memory responses) from the target 304.

In a third example, the credit-based feedback loop 530 includes a read response 532 and a data credit 534. In operation, the memory device 108 transmits the read response 532 to the host device 104. In response to the link controller 312 forwarding the read response 532 to one or more upstream components of the host device 104 (e.g., to a processor 114 of FIG. 3), the credit logic 126 returns the data credit 534 to the credit logic 124. Responsive to return of the data credit 534, the credit logic 124 adds another data credit to the data credit repository or count 536. While the data credit count 536 is greater than zero, the credit logic 124 can permit the link controller 314 to transmit another read response 532. In this manner, the link controller 312 of the initiator 302 can provide feedback or backpressure to the link controller 314 of the target 304 to control (e.g., block, slow, increase/decrease, or otherwise modulate) a flow of the read responses 532.

In a fourth example, the credit-based feedback loop 540 includes a write response 542 and a response credit 544. In operation, the memory device 108 transmits the write response 542 to the host device 104. In response to the link controller 312 forwarding the write response 542 to one or more upstream components of the host device 104 (e.g., to a processor 114 of FIG. 3), the credit logic 126 returns the response credit 544 to the credit logic 124. Responsive to return of the response credit 544, the credit logic 124 adds another response credit to the response credit repository or count 546. While the response credit count 546 is greater than zero, the credit logic 124 can permit the link controller 314 to transmit another write response 542. In this manner, the link controller 312 of the initiator 302 can provide feedback or backpressure to the link controller 314 of the target 304 to control (e.g., block, slow, increase/decrease, or otherwise modulate) a flow of the write responses 542.

The credit-based feedback loops described above enable an initiator 302 or a target 304 to control a quantity or rate of received memory responses or memory requests, respectively. For the memory device 108, this control may relate to ensuring that a queue at the target 304 (e.g., the request queue 452) does not overflow. If the decision to return a credit to the initiator 302 is based solely on a memory request being forwarded out of the request queue 452, memory requests may become too prevalent in backend components, such as an interconnect 306, a memory controller 308, or a DRAM 310 (e.g., each of FIG. 3). For the host device 104, this control may relate to ensuring that a queue at the initiator 302 (e.g., the response queue 406) does not overflow. If the decision to return a credit to the target 304 is based solely on a memory response being forwarded out of the response queue 406, memory responses may become too prevalent in upstream components, such as the processor 114, a memory controller thereof, or an interconnect of the host device.

To at least alleviate the potential overcrowding of communications beyond the queues identified above, such as overcrowding in the backend components of the memory device 108, the techniques described herein can be implemented. Certain ones of these techniques monitor memory requests that are present at the memory device. For example, a counter can include a value indicative of a quantity of memory requests that are outstanding at the memory device, including those pending in the downstream components. The return of credits can be delayed based on the monitoring and/or the value of the counter to slow or possibly stop the transmission of additional requests. Example implementations for memory request modulation are described below with reference to FIGS. 6-9.

Figure 6:
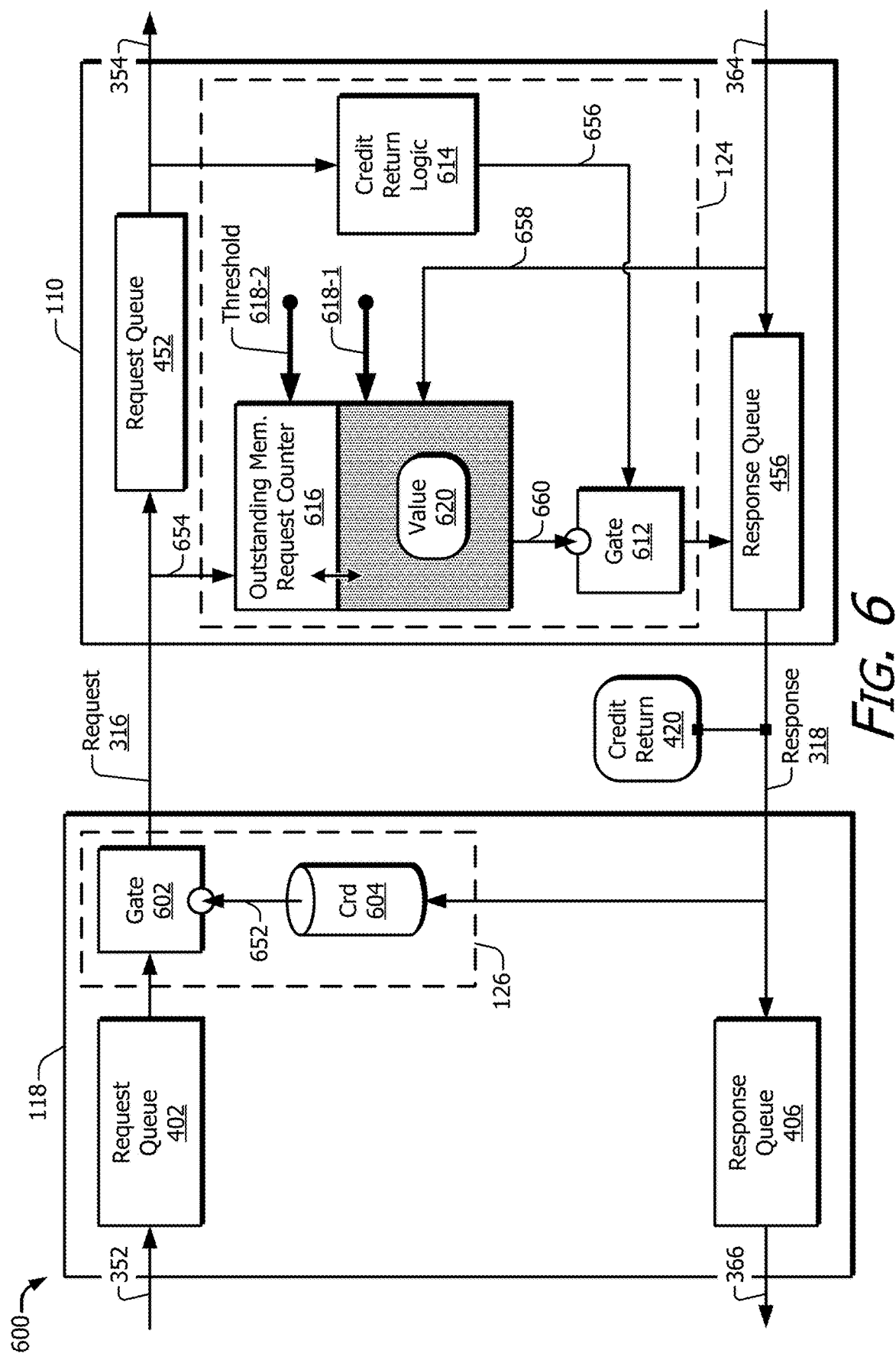
FIG. 6 illustrates example architectures to control a communication flow between two or more devices in accordance with certain implementations for memory request modulation.

FIG. 6 illustrates example architectures 600 to control a communication flow between two or more devices in accordance with certain implementations for memory request modulation. As shown on the left (as depicted in FIG. 6), a controller 118 includes at least one request queue 402, at least one response queue 406, and at least one instance of credit logic 126. The credit logic 126 can include at least one gate 602 and a credit repository or credit counter 604. As shown on the right, a controller 110 includes at least one request queue 452, at least one response queue 456, and at least one instance of credit logic 124. The credit logic 124 can include at least one gate 612, at least one instance of credit return logic 614, and at least one outstanding memory request counter 616.

In example implementations, the controller 118 can transmit a request 316 from the request queue 402 based on a state of the gate 602. If the gate 602 is open (e.g., if a corresponding switch is closed), the controller 118 can transmit a request 316 to the controller 110. On the other hand, if the gate 602 is closed (e.g., if a corresponding switch is opened), the controller 118 is blocked or prevented from transmitting a request 316. The state of the gate 602 can be controlled by the condition or value of the credit repository or credit counter 604.

If the credit repository 604 is empty or if the credit counter 604 has a value that is less than one, the gate 602 is closed by a control signal 652 to prevent transmission of requests. In contrast, if the credit repository 604 has at least one credit or if the credit counter 604 has a value greater than zero, the gate 602 is opened by the control signal 652 to permit or allow the transmission of requests 316. As described above with reference to FIG. 4, responsive to receipt of a credit return 420, a credit is added to the credit repository 604, or the value of the credit counter 604 is incremented. If multiple credits are returned in a single response 318, the credit logic 126 may add multiple credits "at once" to the credit repository 604, or the credit logic 126 may increment the value of the credit counter 604 by an amount greater than one.

At a target 304 (e.g., of FIGS. 3-5), the controller 110 adds a received request 316 to the request queue 452. To process a memory request, the controller 110 transmits a request 316 to a downstream or backend memory component as a memory request 354. The credit logic 124 notifies the credit return logic 614 of this transmission. The credit return logic 614 can include a counter (e.g., a second counter (not shown) of the credit logic 124) that has a value indicative of a quantity of one or more credit returns that are ready to be transmitted to the controller 118. Responsive to the controller 110 removing a request 316 from the request queue 452, the credit return logic 614 can allocate another credit to be returned as a credit return 420. To do so, the credit return logic 614 can increment the second counter.

By establishing an appropriate quantity of credits for the system, this aspect of a credit-based flow control protocol can ensure that a maximum capacity of the request queue 452 is not exceeded. This aspect may not, however, adequately protect the memory device from oversubscribing backend memory components. For example, the "internal" interconnect 306 (of FIG. 3) may become too busy, one or more queues of the memory controllers 308-1 and 308-2 may become overfilled, and/or the multiple DRAMs 310-1 and 310-2 may be unable to fulfill the memory requests as fast as there are delivered to them.

To protect the backend memory components of the memory device 108 from becoming oversaturated, the credit logic 124 can operate the illustrated components to manage how quickly and/or how frequently credits are returned at 420 to the controller 118. The credit logic 124 can condition the return of credits at least partially on receipt of a memory response 364 from a backend memory component. For example, the credit logic 124 can permit a credit return 420 responsive to receipt of a memory response 364.

To reduce the likelihood that a component, such as the interconnect 106 (e.g., of FIGS. 1-4) or a downstream memory controller, is rendered idle unnecessarily, the credit logic 124 can flexibly condition the return of credits on the receipt of memory responses 364. In some cases, the credit logic 124 can use the outstanding memory request counter 616 and at least one threshold 618, such as a first threshold 618-1 and a second threshold 618-2. The outstanding memory request counter 616 can track a quantity of memory requests that are present or extant on the memory device 108, that are currently being processed by the memory device 108, and/or that are pending within the memory device 108. The credit logic 124 can condition the issuance of credit returns 420 on the quantity stored by the outstanding memory request counter 616 and the at least one threshold 618.

In some implementations, the credit logic 124 permits at least one credit return 420 to be sent to the controller 118 based on the outstanding memory request counter 616 and the threshold 618. In example operations, the credit logic 124 increments a value 620 stored by the outstanding memory request counter 616 at 654 responsive to the receipt of each request 316. The credit return logic 614 can enable a credit to be returned at 656 responsive to the memory request 354 being issued from the request queue 452. However, the gate 612 can block the delivery of the credit return 420. A state of the gate 612 may be open or closed, and the state can be established by a control signal 660.

If the gate 612 is open (e.g., a corresponding switch is closed), the credit logic 124 can permit at least one credit return 420 to pass for transmission to the controller 118. On the other hand, if the gate 612 is closed (e.g., a corresponding switch is opened), the controller 110 is blocked or prevented from transmitting a credit return 420. The state of the gate 612 can be controlled responsive to the value 620 of the outstanding memory request counter 616 and based on the threshold 618. As described above, the value 620 can be increased at 654 responsive to receipt of a request 316. To enable the value 620 to represent a quantity of outstanding memory requests of the memory device, the credit logic 124 can decrease (e.g., decrement) the value 620 of the counter at 658 responsive to receipt of a memory response 364. Thus, the value 620 of the outstanding memory request counter 616 can track the quantity of memory requests that are pending within the memory device 108.

The credit logic 124 can compare the value 620 to the at least one threshold 618 to provide a control signal at 660 to the gate 612 to establish a closed state or an open state thereof. For example, if the value 620 is below the threshold 618, the credit logic 124 can keep the gate 612 open to permit credit returns 420 to flow from the credit return logic 614 to the credit logic 126 of the controller 118. If, however, the value 620 is above the threshold 618, the credit logic 124 can close the gate 612 to prevent credit returns 420 from flowing from the credit return logic 614 to the credit logic 126. Over some time period, as memory responses 364 are received from backend memory components, the value 620 decreases due to the decrement signal 658. Responsive to the value 620, which is indicative of the quantity of outstanding memory requests, falling below the threshold 618, the credit logic 124 can reopen the gate 612.

In some implementations, the credit logic 124 operates using multiple thresholds, such as a first threshold 618-1 and a second threshold 618-2. Consider an example in which the second threshold 618-2 is greater than the first threshold 618-1. In operation, the credit logic 124 can block the release of the credit return 420 based on the value 620 of the counter 616 being greater than the second threshold 618-2. The credit logic 124 can permit the release of the credit return 420 based on the value 620 of the counter 616 being less than the first threshold 618-1. To avoid cycling between blocking and permitting transmissions of credit returns, the transmission can be conditional on a recent trend of the value 620 while the value is between the first and second thresholds 618-1 and 618-2 (e.g., while the value is in a "middle" zone between two thresholds).

For instance, the transmission can be conditioned on if the value 620 more recently crossed the first threshold 618-1 and is increasing or more recently crossed the second threshold 618-2 and is decreasing. In operation, the credit logic 124 can block the release of the credit return 420 based on the value 620 of the counter 616 being less than the second threshold 618-2 but greater than the first threshold 618-1 and responsive to the value 620 falling below the second threshold 618-2 from being above the second threshold 618-2 (e.g., responsive to the value 620 crossing the second threshold 618-2 while decreasing). The credit logic 124 can permit the release of the credit return 420 based on the value 620 of the counter 616 being less than the second threshold 618-2 but greater than the first threshold 618-1 and responsive to the value 620 climbing above the first threshold 618-1 from being below the first threshold 618-1 (e.g., responsive to the value 620 crossing the first threshold 618-1 while increasing). This multiple threshold approach also provides the memory device additional time to "catch up" on producing memory responses after the value 620 falls below the second threshold 618-2 before the credit logic 124 begins releasing credit returns again.

Using these techniques, the credit logic 124 can modulate how quickly or how frequently requests 316 are received from the controller 118 based on how "busy" the backend memory components of the memory device 108 are. These techniques can enable the memory device 108 to avoid becoming overwhelmed and/or oversubscribed and, therefore, enable the memory device 108 to provide some specified quality of service. To provide finer control over the memory request modulation and/or to avoid an undesirable hysteresis effect (e.g., oscillation of the state of the gate 612) due to using a single threshold, the at least one threshold 618 can be implemented with multiple thresholds. Example approaches with multiple thresholds are described next with reference to FIG. 7.

Figure 7:
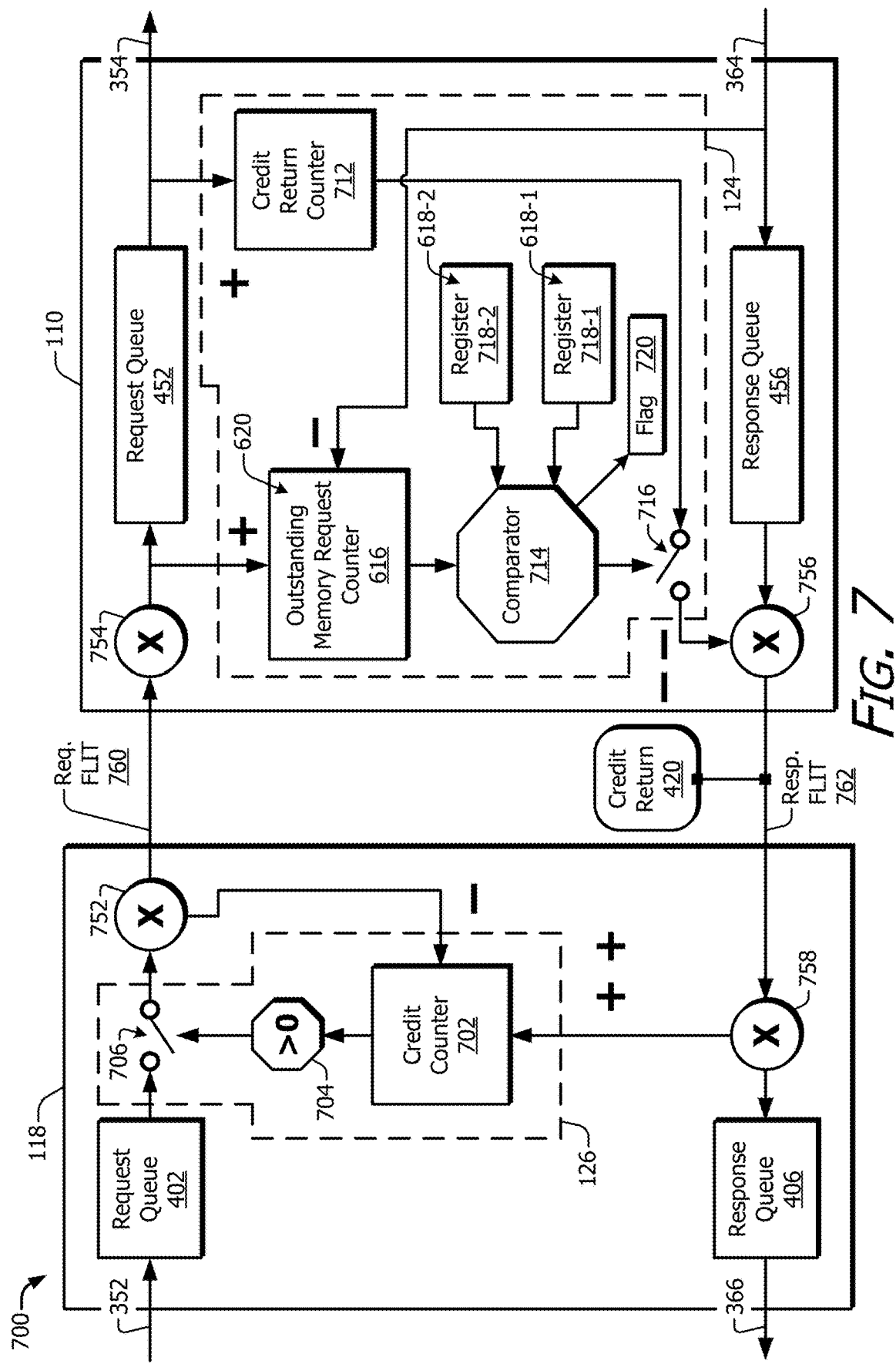
FIG. 7 illustrates other example architectures to control a communication flow between two or more devices in accordance with certain implementations for memory request modulation.

FIG. 7 illustrates other example architectures 700 to control a communication flow between two or more devices in accordance with certain implementations for memory request modulation. As illustrated, the architectures 700 include multiple flit handlers 752, 754, 756, and 758 that process FLITs, such as by creating or interpreting a FLIT. At the controller 118, the credit logic 126 can include at least one credit counter 702, at least one comparator 704, and at least one switch 706. At the controller 110, the credit logic 124 can include the counter 616 (e.g., the outstanding memory request counter 616), at least one credit return counter 712, at least one comparator 714, at least one switch 716, at least one register 718 (e.g., a first register 718-1 and a second register 718-2), and at least one flag 720.

In example implementations, the flit handlers 752 and 756 produce FLITs, and the flit handlers 754 and 758 unpack FLITs. Thus, the flit handler 752 of the controller 118 can transmit a request FLIT 760, and the flit handler 754 of the controller 110 can receive the request FLIT 760. Analogously, the flit handler 756 of the controller 110 can transmit a response FLIT 762, and the flit handler 758 of the controller 118 can receive the response FLIT 762. Responsive to receipt of a response FLIT 762, the flit handler 758 can forward a response to the response queue 406 and provide one or more credit returns 420 to the credit counter 702 of the credit logic 126.

The credit logic 126 can maintain a count of available credits (e.g., request credits 516 or data credits 526 of FIG. 5) using the credit counter 702. The comparator 704 can compare a current count from the credit counter 702 to a set value, such as zero. If the count is greater than zero, the credit logic 126 can close the switch 706 to permit requests to flow. If the count is not greater than zero, the credit logic 126 can open the switch 706 to block requests from flowing. If requests are flowing, the flit handler 752 can prepare a request FLIT 760 and indicate to the credit logic 126 that the count of the credit counter 702 is to be decremented responsive to transmission of a request. Accordingly, while the controller 118 possesses at least one credit, the flit handler 752 can transmit a request FLIT 760 to the flit handler 754 of the controller 110.

The flit handler 754 can unpack the request FLIT 760, forward a memory request to the request queue 452, and notify the credit logic 124 that the value 620 of the counter 616 is to be incremented. Alternatively, the request queue 452, or associated logic, can notify the credit logic 124 that the value 620 of the counter 616 is to be incremented. Responsive to a request being forwarded from the request queue 452, the credit logic 124 increments a count of the credit return counter 712. Each register 718 can store a corresponding or respective threshold 618. The first register 718-1 may store the first threshold 618-1, and the second register 718-2 may store the second threshold 618-2. The flag 720 can include at least one bit indicative of whether the switch 716 is to be in a closed state, which permits credit returns, or an open state, which blocks credit returns.

In example operations at the controller 110, the comparator 714 can compare the value 620 to the first threshold 618-1 and the second threshold 618-2 as described herein. In some cases, the first and second thresholds 618-1 and 618-2 can operate as low and high watermarks, respectively, as described below. In response to one or more comparisons performed by the comparator 714, the credit logic 124 clears or sets the flag 720. The credit logic 124 may control the state of the switch 716 based on the flag 720. If the switch 716 is open, no credits are being returned. If the switch 716 is closed, one or more credit returns 420 can be transmitted in at least one response FLIT 762 by the flit handler 756 based on the count of the credit return counter 712. The credit logic 124 can reduce the count of the credit return counter 712 as credits are returned while the switch 716 is closed.

In example implementations using two thresholds, when a quantity of outstanding memory requests (e.g., read requests) on the memory device crosses a high-level watermark value (e.g., indicating that the memory device has become oversubscribed), the credit logic 124 withholds the returning of credits (e.g., at least one REQCRD return for a read request) back to the host device. The credit logic 124 again starts sending credits (e.g., the REQCRD returns) back to the host device when the quantity of outstanding requests (e.g., read requests) on the memory device drops below the low-level watermark value. These watermarks can be adjusted based on slower or faster backend memory subsystems or, in some cases, contemporaneously based on a current latency. By modulating (e.g., limiting or moderating) the rate at which credits at the host device get replenished, described techniques can throttle the host's ability to send traffic to the memory device. This throttling can reduce queuing latency on the memory device request buffer or the memory device response buffer, including both.

The one or more registers 718 may be realized as read-only or as read/write registers. In some implementations, the first register 718-1 may correspond to a low watermark threshold (e.g., be a CXL_Device_Request_Outstanding_Low_Watermark_REG). The second register 718-2 may correspond to a high watermark threshold (e.g., be a CXL_Device_Request_Outstanding_High_Watermark_REG). The counter 616 can keep track of a quantity of outstanding requests at the device (e.g., function as a CXL_Device_Request_Outstanding_COUNTER). The flag 720 may correspond to a Boolean value indicative of whether credit returns are being withheld (e.g., function as a Withhold_Returning_Credit_Flag).

Thus, the Boolean flag can track if a credit can be returned or not as part of a response FLIT 762 that is leaving the memory device. For instance, the flag values can be set as follows: a one (1)=enable withholding, and a zero (0)=disable withholding. If CXL_Device_Request_Outstanding_COUNTER>CXL_Device_Request_Outstanding_High_Watermark_REG, then the flag is set to one (1). If CXL_Device_Request_Outstanding_COUNTER<CXL_Device_Request_Outstanding_LowWatermark_REG, then the flag is set to zero (0).

In some implementations, to initialize the credit logic 124, the credit logic 124 can read the CXL_Device_Request_Outstanding_High_Watermark_REG to obtain a value for the high watermark beyond which the memory device is to start back-pressuring the host device. The credit logic 124 can also read the CXL_Device_Request_Outstanding_LowWatermark_REG to obtain the low watermark below which the memory device is to return to "normal" operation with respect to returning credits to the host device. If a new request is received by the memory device, the credit logic 124 can increment the CXL_Device_Request_Outstanding_COUNTER. If a response leaves the memory device for the host device, the credit logic 124 can decrement the CXL_Device_Request_Outstanding_COUNTER.

Generally, if a quantity of outstanding requests is greater than the value specified in the high watermark register, the credit logic 124 can withhold the returning of credits back to the host device. Because the credit logic 124 can delay the return of credits to the host device, the rate at which the host can send new requests to the memory device can be reduced. The withholding of credit returns may be effectuated by setting the Withhold_Returning_Credit_Flag to one (1). Thus, the credit return 420 is gated in this condition by the switch 716, and the flit handler 756 does not attach a credit return to the response FLIT 762. On the other hand, if the quantity of outstanding requests is less than the value specified in the low watermark register, the credit logic 124 can send credit returns 420 back to the host device at a normal rate. This allows the host device to again send traffic to the memory device at normal rate. The return to a normal credit return rate may be effectuated by removing the gating performed by the switch 716 by setting the Withhold_Returning_Credit_Flag to zero (0).

Thus, the high-level and low-level watermark registers reflect the higher and lower cut-off levels, respectively, beyond which (e.g., above which or below which, respectively) the memory device backpressures the host device, or the memory device allows the host device to resume normal operation, respectively. Note, however, that the high register value specifies a starting point at which the memory device begins back-pressuring the host. The host device may still possess one or more credits and may, therefore, continue sending more requests until the host exhausts its currently remaining credits. The watermarks can be adjusted to account for slower backend memory subsystems (e.g., by keeping the low watermark to a low value) or faster backend memory subsystems (e.g., by keeping the high watermark high and the low watermark high) to allow more traffic to come from the host device. The credit logic 124 may also adjust these values during operation based on a measured latency or bandwidth/throughput.

The credits for the example architectures 600 and 700 can correspond at least to any of the credits described above, such as request credits, data credits, or response credits. The requests 316 may correspond, for instance, to read requests or write requests in a memory context. The responses 318 may correspond, for instance, to read responses or write responses in a memory context. Nonetheless, the principles described with reference to FIG. 6 are applicable to other types of credits, communications, and/or environments. Also, although certain concepts are described herein in the context of CXL Type 3 devices ("Memory Expanders"), the described techniques can be applied to other CXL device types and/or to non-CXL devices.

Further, the described principles are applicable to environments generally having credit-based communications. For example, a transmitter or initiator component may transmit requests besides memory requests. Similarly, a receiver or target component may receive "general" requests instead of or in addition to memory requests. Accordingly, the credit logic 124 may monitor the presence of pending requests at the target for non-memory requests, such as a computational request (e.g., for a cryptographic, AI accelerator, or graphics computation), a communications request (e.g., for transmitting or receiving a packet over some interface or network), and so forth. The described techniques can ensure that other types of targets— besides memory devices—do not become oversubscribed if the corresponding requests are pending "too long" in the backend of the other targets while a request queue at a controller is at least partially empty.

Example Methods

Figure 8:
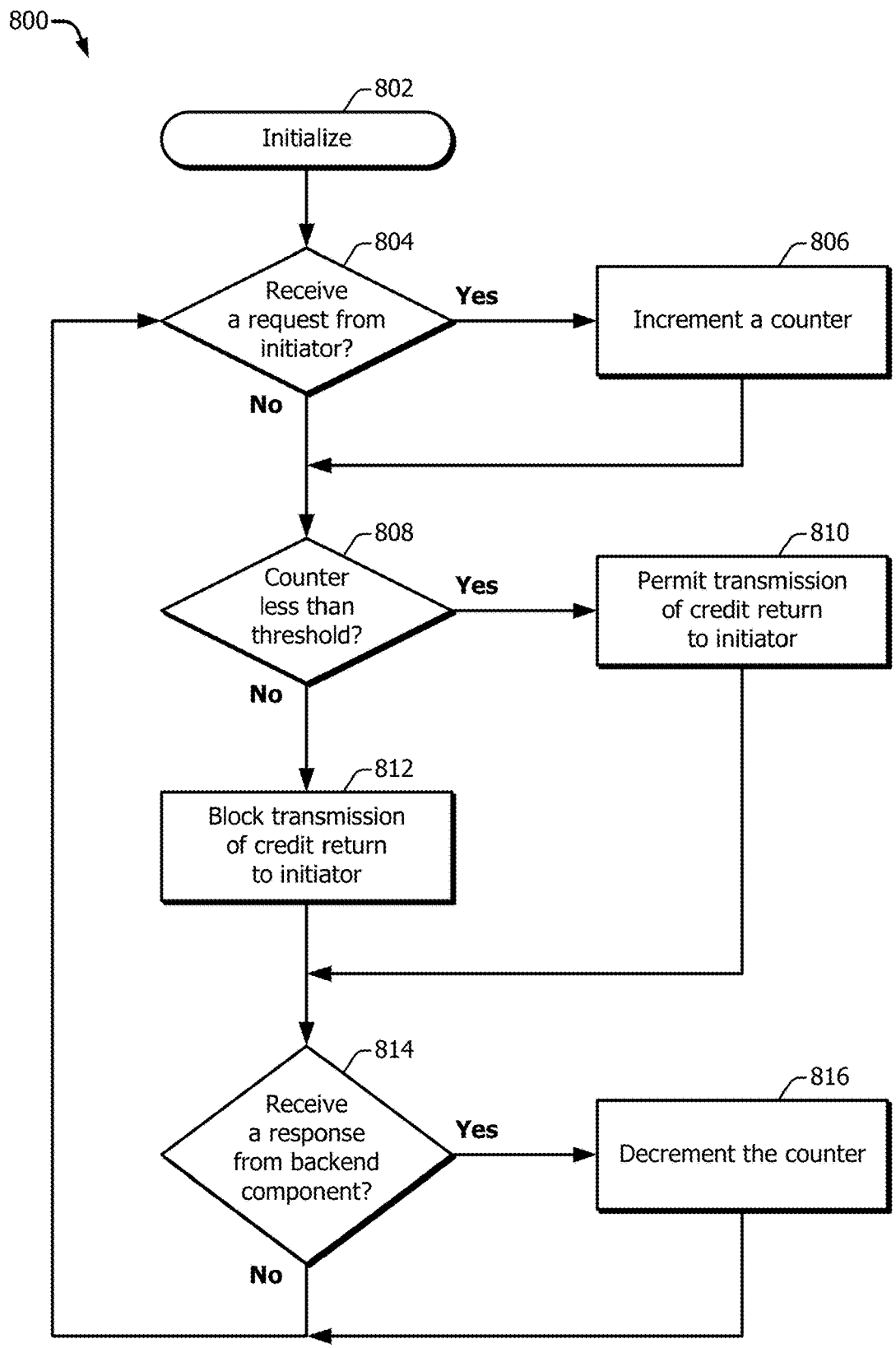
FIG. 8 illustrates a flow chart for an example process that implements request modulation.

This section describes example methods with reference to the flow chart(s) and flow diagram(s) of FIGS. 8 and 9 for implementing memory request modulation. These descriptions may also refer to components, entities, and other aspects depicted in FIGS. 1-7, which reference is made only by way of example.

FIG. 8 illustrates a flow chart for an example process 800 that implements request modulation. The process 800 can include blocks 802-816. The process 800 may be performed by, for instance, a target device that is in communication with an initiator device. In a memory environment, for example, the target device may be realized with a memory device, and an initiator device may be realized with a host device. The target device can additionally or alternatively be realized with a communication device (e.g., a modem), an accelerator device (e.g., for AI operations), a graphics device (e.g., a graphics card), and so forth. The initiator can be any device or component that is requesting a service or operation from the target.

At block 802, a target initializes circuitry to implement request modulation. For example, the target can clear at least one request or response queue, load at least one register, access (e.g., read or write) at least one nonvolatile register, set at least one counter value (e.g., to zero), and the like. In a memory environment, for instance, a controller 110 of a memory device 108 may empty a request queue 452 and a response queue 456, may access or load a register 718-1 or 718-2, or may set the value 620 of the counter 616 to zero (0).

At block 804, the target monitors an interconnect for receipt of a request from an initiator and/or determines if a request is received. If a request is received from the initiator, the target increments a counter at 806. The counter can include a value indicative of a quantity of requests that are outstanding at the target, including a device thereof. The value may indicate how many requests are pending at a device corresponding to the target, how many requests are received but not yet processed, how many requests are received but not responded to yet, how many requests are in-progress in downstream or backend components of the target device, combinations thereof, and so forth.

In some cases, a request may be considered outstanding until a response is transmitted to the initiator. Alternatively, a request may cease to be considered outstanding once an "internal" response is received at the controller of the initiator from a backend component. Outstanding requests, however, may be characterized differently depending on the environment, and/or the thresholds may be determined variously depending on how the outstanding requests are characterized. For example, a threshold may be set higher in a system that includes the responses still present in a response queue at the target's controller as compared to a threshold in a system that excludes such responses from an outstanding request count.

Responsive to incrementing the counter at block 806, or if a request is not received from the initiator at block 804, the flow of the process 800 can continue at block 808. At block 808, the target can compare a value of the counter to at least one threshold. If the counter is less than the threshold, then at block 810 the target can permit transmission of at least one credit return to the initiator. Thus, if the target has any available or pending credits to be returned to the initiator, the target can send those one or more credits "back" to the initiator. In some cases, the target can transmit at least one credit return to the initiator as part of a response for the initiator. After permission is provided (e.g., a gate is opened or allowed to remain open) at block 810, the process 800 can continue at block 814.

If, however, at block 808 a value of the counter is not determined to be less than the at least one threshold (or the counter is determined to be greater than the at least one threshold), then at block 812 the target can block transmission of one or more pending credit returns to the initiator. For example, logic can close a gate or cause a gate to continue to be closed if the value of the counter exceeds a threshold value relating to a number of requests that can be pending in the target device without unreasonably impacting latency. Additionally or alternatively, logic that authorizes or controls the return of credits may be paused or stopped while the counter is greater than the threshold. After the target activates the blocking of credit return transmissions, the process 800 can continue at block 814.

At block 814, the target determines if a response has been or is being received from a backend component of the target device. Examples of backend components include memory components (e.g., a memory controller or a memory array), a modem or communication interface, a processor or accelerator (e.g., for graphics, neural networks, or cryptographic operations), and so forth. If another response has been received from a backend component, the target can decrement the counter at block 816. Thus, a value indicative of an outstanding request is increased responsive to an arrival of a request from an initiator (at block 806) and is decreased responsive to an arrival of a response from a backend component (at block 816). This can entail decrementing the counter responsive to receipt of a response from the backend component. The decrementing can further (additionally or alternatively) be responsive to transmitting the response from the target device to the initiator device.

After or responsive to the counter being decremented at block 816, the process 800 can continue at block 804. Likewise, if no response is received from a backend component at block 814, the process 800 can also continue at block 804. Thus, the target can continually monitor the status of requests and responses at blocks 804 and 814, respectively. In response to the determinations and/or comparisons of blocks 804 and 814, the target can update the value of the counter at blocks 806 and 816, respectively. Further, the target can compare the counter to at least one threshold at block 808 and then permit or block the return of credits at blocks 810 and 812, respectively, based on the comparison at block 808. If multiple thresholds are employed (e.g., as described above with reference to FIG. 6 or 7 or below with reference to FIG. 9), the blocking or permitting can be based on comparisons to the multiple thresholds and responsive to the directional passing (e.g., increasing or decreasing of the counter) across a given threshold. The acts shown in FIG. 8 may be performed in other orders and/or in partially or fully overlapping manners or in conjunction with the acts of FIG. 9.

FIG. 9 illustrates a flow diagram for an example process 900 that implements memory request modulation. At block 902, a controller of a memory device adjusts a value stored in a counter, with the value indicative of a quantity of memory requests that are outstanding at the memory device. For example, a controller 110 of a memory device 108 can adjust a value 620 stored in a counter 616, with the value 620 indicative of a quantity of memory requests that are outstanding at the memory device 108. The controller 110 may, for instance, increment (e.g., increase a value of) an outstanding memory request counter 616 responsive to arriving memory requests 316 and decrement (e.g., decrease the value of) the outstanding memory request counter 616 responsive to arriving memory responses 364 and/or decrement the outstanding memory request counter 616 responsive to transmitted memory responses 318.

In some cases, the value 620 of the counter 616 can be indicative of a quantity of memory requests 316 that are pending in the memory device 108. For example, the value 620 of the counter 616 can be indicative of at least a quantity of requests 316 for a memory operation that have been added to a request queue 452 and not yet had a corresponding response 364 added to a response queue 456. A request 316 may cease to be outstanding relative to the memory device 108 responsive to receipt of the memory response 364 at the controller 110 of a target 304, responsive to adding the memory response 364 to the response queue 456, responsive to removing the memory response 364 from the response queue 456, and/or responsive to transmitting the corresponding memory response 318 from the controller 110 to a controller 118 of an initiator 302.

At block 904, the controller of the memory device transmits a credit return based on the value of the counter and at least one threshold. For example, the controller 110 of the memory device 108 can transmit a credit return 420 based on the value 620 of the counter 616 and at least one threshold 618. The transmission may be based on a comparison including the value 620 and the at least one threshold 618. The controller 110 may permit transmission of the credit return 420 responsive to the value 620 of the counter 616 being less than the at least one threshold 618. On the other hand, the controller 110 may block transmission of the credit return 420 responsive to the value 620 of the counter 616 being greater than the at least one threshold 618.

In some cases, the controller 110 can transmit the credit return 420 based on the value 620 of the counter 616, a first threshold 618-1, and a second threshold 618-2. For example, the controller 110 can compare the value 620 of the counter 616 to the first threshold 618-1 and to the second threshold 618-2. Based on the value 620 of the counter 616 being less than the first threshold 618-1, the controller 110 can permit transmission of the credit return 420. Based on the value 620 of the counter 616 being greater than the second threshold 618-2, the controller 110 can block transmission of the credit return 420.

If employing multiple thresholds, the controller 110 can manage credit returns in a middle zone between two thresholds in the following example manners. The controller 110 may permit transmission of the credit return 420 based on the value 620 of the counter 616 being less than the second threshold 618-2 but greater than the first threshold 618-1 and responsive to the value 620 climbing above the first threshold 618-1 from being below the first threshold 618-1 (e.g., the value 620 crosses the first threshold 618-1 while increasing). Further, the controller 110 may block transmission of the credit return 420 based on the value 620 of the counter 616 being less than the second threshold 618-2 but greater than the first threshold 618-1 and responsive to the value 620 falling below the second threshold 618-2 from being above the second threshold 618-2 (e.g., the value 620 crosses the second threshold 618-2 while decreasing).

For the flow chart(s) and flow diagram(s) described above, the orders in which operations are shown and/or described are not intended to be construed as a limitation. Any number or combination of the described process operations can be combined or rearranged in any order to implement a given method or an alternative method. Operations may also be omitted from or added to the described methods.

Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 to 7, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for memory request modulation have been described in language specific to certain features and/or methods, the subject of the appended claims is not necessarily limited to the specific features or methods described. Rather, the specific features and methods are disclosed as example implementations for memory request modulation.

What is claimed is:

1. An apparatus comprising:
   a request queue configured to store multiple memory requests;
   a counter configured to store a value indicative of a quantity of the multiple memory requests that are outstanding;
   a second counter indicative of one or more credits to be returned to a device that provides the multiple memory requests, the second counter configured to operate based on a second quantity of the multiple memory requests that are stored in the request queue; and
   a gate configured to condition return of at least one credit of the one or more credits that are indicated by the second counter based on the value of the counter and at least one threshold.

2. The apparatus of claim 1, further comprising:
   credit logic configured to increment the value of the counter responsive to receipt of a memory request; and
   at least one register configured to store the at least one threshold.

3. The apparatus of claim 2, wherein:
   the at least one threshold comprises a first threshold and a second threshold; and
   the at least one register comprises:
      a first register configured to store the first threshold; and
      a second register configured to store the second threshold.

4. The apparatus of claim 3, further comprising:
   at least one comparator configured to perform at least one comparison including the value of the counter, the first threshold, and the second threshold,
   wherein the gate is configured to gate a release of at least one credit return based on the at least one comparison.

5. The apparatus of claim 4, wherein the gate is configured to:
   block the release of the at least one credit return based on the value of the counter being greater than the second threshold; and
   permit the release of the at least one credit return based on the value of the counter being less than the first threshold.

6. The apparatus of claim 5, wherein the gate is configured to:
   block the release of the at least one credit return based on the value of the counter being less than the second threshold but greater than the first threshold and responsive to the value falling below the second threshold from being above the second threshold; and
   permit the release of the at least one credit return based on the value of the counter being less than the second threshold but greater than the first threshold and responsive to the value climbing above the first threshold from being below the first threshold.

7. The apparatus of claim 2, further comprising:
   a response queue configured to store multiple memory responses,
   wherein the credit logic is configured to decrement the value of the counter responsive to receipt at the response queue of a memory response of the multiple memory responses.

8. The apparatus of claim 2, further comprising:
   a response queue configured to store multiple memory responses,
   wherein the credit logic is configured to decrement the value of the counter responsive to transmission from the response queue of a memory response of the multiple memory responses.

9. The apparatus of claim 1, wherein the request queue is configured to output the multiple memory requests to one or more memory components.

10. The apparatus of claim 9, wherein the one or more memory components comprise at least one of:
    a memory controller; or
    a memory array.

11. The apparatus of claim 10, wherein the memory array comprises at least one of:
    a dynamic random-access memory (DRAM) array; or
    a nonvolatile memory array.

12. The apparatus of claim 9, further comprising:
    the one or more memory components.

13. The apparatus of claim 1, wherein:
    the request queue is configured to output the multiple memory requests to one or more backend memory components; and
    the value of the counter is indicative of at least a quantity of the multiple memory requests that are present in the one or more backend memory components.

14. The apparatus of claim 13, further comprising:
a response queue configured to receive multiple memory responses from the one or more backend memory components,
wherein the value of the counter is indicative of at least a quantity of the multiple memory requests that have been output from the request queue and not yet had a corresponding memory response added to the response queue from the one or more backend memory components.

15. The apparatus of claim 1, further comprising:
credit logic configured to increment the value of the counter responsive to receipt from an initiator of a memory request of the multiple memory requests; and
a target comprising the request queue, the counter, the second counter, the gate, and the credit logic.

16. The apparatus of claim 1, wherein the apparatus comprises a Compute Express Link™ (CXL) memory device.

17. The apparatus of claim 16, wherein the CXL memory device comprises a Type 3 CXL memory device.

18. A method comprising:
receiving, at a controller of a memory device, a request to perform a memory operation;
adjusting, by the controller of the memory device, a value stored in a counter, the value indicative of a quantity of memory requests that are outstanding at the memory device, including incrementing the value of the counter responsive to the receiving;
adding the request to a request queue;
forwarding the request from the request queue to at least one memory component of the memory device as a memory request;
incrementing a second counter indicative of one or more credits to be returned to another device responsive to the forwarding; and
transmitting, by the controller of the memory device, a credit return based on the value of the counter and at least one threshold.

19. The method of claim 18, further comprising:
transmitting, by the controller of the memory device, the credit return based on the value of the counter, a first threshold, and a second threshold.

20. The method of claim 19, further comprising:
comparing the value of the counter to the first threshold and the second threshold;
permitting transmission of the credit return based on the value of the counter being less than the first threshold; and
blocking transmission of the credit return based on the value of the counter being greater than the second threshold.

21. The method of claim 20, further comprising:
permitting transmission of the credit return based on the value of the counter being less than the second threshold but greater than the first threshold and responsive to the value climbing above the first threshold from being below the first threshold; and
blocking transmission of the credit return based on the value of the counter being less than the second threshold but greater than the first threshold and responsive to the value falling below the second threshold from being above the second threshold.

22. The method of claim 19, further comprising:
adjusting at least one of the first threshold or the second threshold based on a latency associated with responding to multiple memory requests.

23. The method of claim 18, further comprising:
decrementing, by the controller, the value of the counter responsive to receiving a memory response from a component of the memory device.

24. The method of claim 23, further comprising:
decrementing, by the controller, the value of the counter responsive to receiving the memory response from a memory array of the memory device.

25. The method of claim 23, further comprising:
decrementing, by the controller, the value of the counter responsive to receiving the memory response from a memory controller of the memory device.

26. The method of claim 18, further comprising:
decrementing, by the controller, the value of the counter responsive to transmitting a memory response from a response queue of the memory device.

27. The method of claim 18, further comprising:
comparing the value of the counter to the at least one threshold; and
gating a return of the one or more credits based on the comparing.

28. The method of claim 18, further comprising:
receiving, at the controller from the at least one memory component, a memory response corresponding to the memory request; and
adding the memory response to a response queue,
wherein the adjusting includes decrementing the value of the counter responsive to at least one of the receiving of the memory response or the adding of the memory response.

29. The method of claim 18, further comprising:
transmitting, by the controller of the memory device, the credit return to a host device over an interconnect.

30. The method of claim 29, further comprising:
transmitting, by the controller of the memory device, the credit return to the host device over the interconnect in accordance with at least one version of a Compute Express Link™ (CXL) standard.

31. The method of claim 18, further comprising:
transmitting, by the controller of the memory device, multiple credit returns that are incorporated into at least one flit, the multiple credit returns including the credit return.

32. The method of claim 18, wherein:
the memory requests comprise multiple read requests; and
the credit return corresponds to a request credit.

33. The method of claim 18, wherein:
the memory requests comprise multiple write requests; and
the credit return corresponds to a data credit.

34. The method of claim 18, wherein the value of the counter is indicative of the quantity of memory requests that are pending in the memory device.

35. The method of claim 34, wherein the value of the counter is indicative of at least a quantity of requests for a memory operation that have been added to the request queue and not yet had a corresponding response added to a response queue.

36. The method of claim 18, further comprising:
permitting transmission of the credit return responsive to the value of the counter being less than the at least one threshold; and
blocking transmission of the credit return responsive to the value of the counter being greater than the at least one threshold.

37. An apparatus comprising:
a request queue configured to output multiple memory requests;
a response queue configured to receive multiple memory responses corresponding to the multiple memory requests;
a counter configured to store a value; and
credit logic configured to:
increment the value responsive to receipt of a memory request for a memory operation; and
decrement the value responsive to receipt of a memory response of the multiple memory responses.

38. The apparatus of claim 37, further comprising:
a controller, the controller comprising the request queue, the response queue, the counter, and the credit logic; and
a memory component coupled to the controller.

39. The apparatus of claim 38, wherein:
the memory component is configured to provide the memory response based on a corresponding memory request of the multiple memory requests; and
the controller is configured to receive the memory response from the memory component.

40. The apparatus of claim 38, wherein:
the controller is configured to operate as a target for a memory device;
the target is configured to receive the multiple memory requests for multiple memory operations from an initiator of a host device; and
the target is configured to add the multiple memory requests for the multiple memory operations in the request queue.

41. The apparatus of claim 40, wherein:
the apparatus comprises the memory device; and
the memory device is configured to operate in a cache coherent memory domain in conjunction with the host device.

42. The apparatus of claim 37, wherein:
the credit logic is configured to manage credit returns based on the value stored in the counter and at least one threshold.

43. The apparatus of claim 42, wherein:
the credit logic is configured to block the credit returns responsive to the value stored in the counter being greater than the at least one threshold.

44. An apparatus comprising:
a memory array;
a memory controller coupled to the memory array; and
a controller comprising a request queue and coupled to the memory controller, the controller configured to:
monitor, using a counter, a quantity of memory requests that are pending at the memory array or the memory controller;
monitor, using a second counter, a second quantity of memory requests that are stored in the request queue, the second quantity indicative of at least one credit to be returned to a device that provides the memory requests; and
modulate one or more credits being returned to the device based on the quantity of memory requests.

45. The apparatus of claim 44, wherein the controller is configured to:
delay returning a credit based on the quantity of memory requests and at least one threshold to modulate arrival of additional memory requests at the request queue of the controller.

46. The apparatus of claim 1, further comprising:
at least one of a memory controller or a memory array that is coupled to the request queue,
wherein the quantity of the multiple memory requests that are outstanding comprises at least a quantity of the multiple memory requests that are present in at least one of the memory controller or the memory array.

* * * * *